United States Patent
Nagasaka

(10) Patent No.: US 6,519,049 B1
(45) Date of Patent: Feb. 11, 2003

(54) PRINT DATA TRANSFER SYSTEM, METHOD OF TRANSFERRING PRINT DATA, AND COMPUTER PROGRAM PRODUCT TO EFFECT THE METHOD

(75) Inventor: Fumio Nagasaka, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/218,155

(22) Filed: Dec. 22, 1998

(30) Foreign Application Priority Data

Dec. 24, 1997 (JP) ............................................. 9-367107
Feb. 16, 1998 (JP) ........................................... 10-051360

(51) Int. Cl.[7] .......................... B41B 19/00; B41F 27/00; G06F 15/00; G06K 1/00
(52) U.S. Cl. ...................... 358/1.15; 358/1.9; 358/1.15; 358/400; 358/518; 358/1.14
(58) Field of Search ............................... 358/1.15, 400, 358/518, 1.9, 1.14

(56) References Cited

U.S. PATENT DOCUMENTS

| 5,296,935 | A | | 3/1994 | Bresler |
| 5,699,494 | A | * | 12/1997 | Colbert et al. .............. 358/1.13 |
| 5,900,860 | A | * | 5/1999 | Ueda ............................ 358/518 |
| 5,933,144 | A | * | 8/1999 | Alcorn ........................ 358/1.14 |
| 6,310,696 | B1 | * | 10/2001 | Kumada ...................... 358/1.9 |
| 6,333,790 | B1 | * | 12/2001 | Kageyama ................. 358/1.15 |
| 6,342,952 | B1 | * | 1/2002 | Chan .......................... 345/593 |

FOREIGN PATENT DOCUMENTS

| EP | 0 581 590 | 2/1994 |
| WO | WO 96/01467 | 1/1996 |

OTHER PUBLICATIONS

IPP (Internet Printing Protocol 1 page).

* cited by examiner

*Primary Examiner*—Edward Coles
*Assistant Examiner*—Ashanti Ghee
(74) *Attorney, Agent, or Firm*—Oblon, Spivak, McClelland, Maier & Neustadt, P.C.

(57) ABSTRACT

In a receiver computer 100, a transmission controller 111 transmits user interface data 171 to a transmitter computer 200. In the transmitter computer 200, a display processing unit 213 causes a user interface for inputting print settings information to be displayed on the screen of a monitor 250, based on the transmitted user interface data 171. When the print settings information is input via an input device 240, a transmission controller 211 transmits color image data 271, color-correction source data 272, and the input print settings information to the receiver computer 100. In the receiver computer 100, a print processing unit 114 carries out a variety of processing operations with respect to color image data, based on the print settings information. A color correction element 118 in the print processing unit 114 carries out a color correction of the color image data using the color-correction source data 272 and color-correction destination data 172 read from a hard disk 170. A printer 180 prints a color image, which is expressed by the contents of the color-corrected color image data. This arrangement enables a printer connected to the receiver computer to print a color image based on the print data transmitted from the transmitter computer via a computer network, even if a printer driver exclusively provided for the printer has not been installed in the transmitter computer.

20 Claims, 10 Drawing Sheets

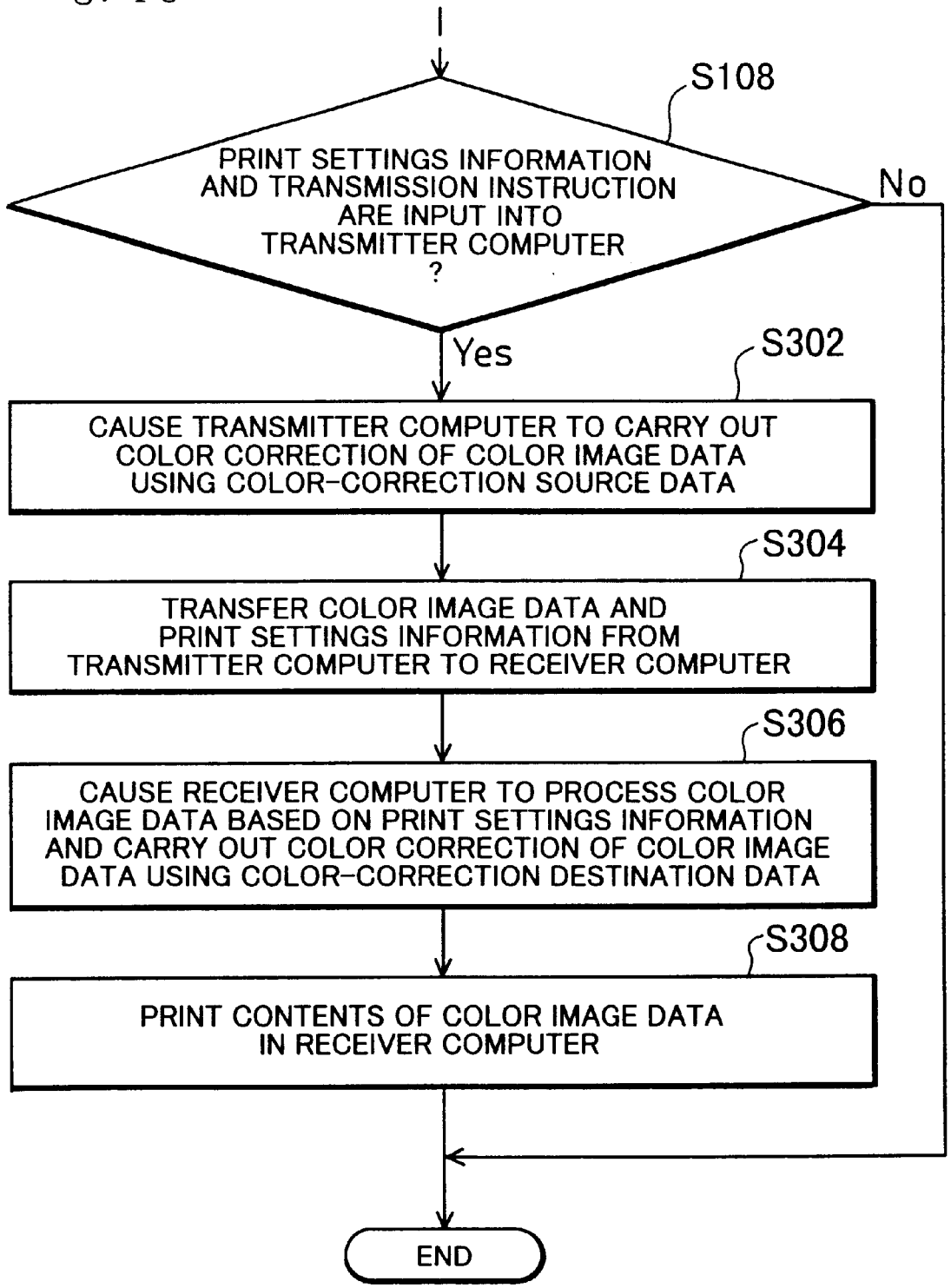

PRINT DATA TRANSFER SYSTEM, METHOD OF TRANSFERRING PRINT DATA, AND COMPUTER PROGRAM PRODUCT TO EFFECT THE METHOD

BACKGROUND OF THE INVENTION

1. Field of the Invention

The present invention relates to a technique of transferring print data from one computer to another computer in a computer network, to which a plurality of computers are connected.

2. Description of the Related Art

In a known print data transfer system, print data is transmitted from a certain transmitter computer connected to a computer network to a receiver computer connected to the same computer network, so that a printer connected to the receiver computer (that is, a network printer) prints the contents of the transmitted print data.

The network printer may be connected directly with the receiver computer, connected indirectly with the receiver computer via another computer network, or integrated with the receiver computer.

In the prior art print data transfer system, it is generally necessary to install a printer driver exclusively provided for a network printer in the transmitter computer, in order to cause the network printer to print the contents of the print data. When there are a plurality of network printers available for printing, a plurality of printer drivers exclusively provided for the respective network printers should be installed in the transmitter computer.

SUMMARY OF THE INVENTION

The object of the present invention is thus to provide a print data transfer system that enables a printer connected to a receiver computer to print a color image based on the print data transmitted from a transmitter computer via a computer network, even if a printer driver exclusively provided for the printer has not been installed in the transmitter computer, as well as to provide a method of transferring print data and a computer program product for actualizing the method.

At least part of the above and the other related objects is realized by a first print data transfer system includes: a first computer; a second computer connected to the first computer via a computer network; and a printer which is connected to the second computer and prints contents represented by print data. In the first print data transfer system, the first computer includes a first memory that stores the print data, a first transmission unit that executes transmission of the print data, an input device, a display device, and a first controller that controls operation of the first computer. The second computer includes a second memory that stores user interface data, which is used to display a user interface for allowing a user to input print settings information for the printer, a second transmission unit that executes transmission of the user interface data, and a second controller that controls operation of the second computer. In the first print data transfer system, the first controller causes the first transmission unit to send an instruction for starting a transmission process of the print data to the second computer when receiving the instruction for starting the transmission process via the input device. The second controller reads the user interface data from the second memory and causes the second transmission unit to send the user interface data to the first computer when receiving the instruction for starting the transmission process via the second transmission unit. The first controller causes the display device to display the user interface for allowing the user to input print settings information based on the user interface data when receiving the user interface data via the first transmission unit. The first controller reads the print data from the first memory and causes the first transmission unit to send the print data and the print settings information, which is to be used in a printing process by the printer, to the second computer when receiving the print settings information and a transmission instruction of the print data via the input device. The second controller causes the printer to print the contents represented by the print data according to the print settings information when receiving the print data and the print settings information via the second transmission unit.

The present invention is also directed to a first transmitter for transmitting print data to a receiver, which is connected to a printer, via a computer network. The transmitter includes: a memory that stores the print data; a transmission unit that executes transmission of the print data; an input device; a display device; and a controller that controls operation of the transmitter. In the first transmitter, the controller causes the transmission unit to send an instruction for starting a transmission process of the print data to the receiver when receiving the instruction for starting the transmission process via the input device. The controller causes the display device to display user interface for allowing a user to input print settings information for the printer based on user interface data when receiving the user interface data transmitted from the receiver via the transmission unit. The controller reads the print data from the memory and causes the transmission unit to send the print data and the print settings information, which is to be used in a printing process by the printer, to the receiver when receiving the print settings information and a transmission instruction of the print data via the input device.

The present invention is further directed to a first receiver, which is connected to a printer, for receiving print data from a transmitter via a computer network. The receiver includes: a memory that stores user interface data, which is used to display a user interface for allowing a user to input print settings information for the printer; a transmission unit that executes transmission of the user interface data; and a controller that controls operation of the receiver. In the first receiver, the controller reads the user interface data from the memory and causes the transmission unit to send the user interface data to the transmitter when receiving the instruction for starting the transmission process from the transmitter via the transmission unit. The controller causes the printer to print the contents represented by the print data according to the print settings information when receiving the print data and the print settings information, which is to be used in a printing process by the printer, transmitted from via the transmission unit.

The present invention is also directed to a first method of transferring print data, which represents contents to be printed, from a first computer including at least a display device to a second computer, which is connected to a printer, via a computer network. The first method includes the steps of: (a) causing the first computer to transmit an instruction for starting a transmission process to the second computer, when the first computer receives the instruction for starting the transmission process of the print data; (b) causing the second computer to transmit user interface data, which is used to display a user interface for allowing a user to input print settings information for the printer, to the first computer, when the second computer receives the instruction for starting the transmission process; (c) causing the display device to display the user interface for allowing the user to input print settings information based on the user interface data, when the first computer receives the user interface data; (d) causing the first computer to transmit the print data and the print settings information, which is to be used in a printing process by the printer, to the second computer, when the first computer receives the print settings information and a transmission instruction of the print data; and (e) causing the printer to print the contents represented by the print data according to the print settings information, when the second computer receives the print data and the print settings information.

The present invention is also directed to a first computer program product that causes a computer including at least a display device to transmit print data to a receiver, which is connected to a printer, via a computer network. The computer program product including: a computer readable medium; a first program code unit that causes the computer to transmit an instruction for starting a transmission process of the print data to the receiver when the instruction for starting the transmission process is input; a second program code unit that causes the computer to receive user interface data, which is used to display a user interface for allowing a user to input print settings information for the printer, when the user interface data is transmitted from the receiver, and that causes the display device to display the user interface for allowing a user to input print settings information based on the user interface data; and a third program code unit that causes the computer to transmit the print data and the print settings information, which is to be used in a printing process by the printer, to the receiver when the print settings information and a transmission instruction of the print data are input, wherein each of the program code units is registered on the computer readable medium.

The present invention is further directed to a second computer program product that causes a computer, which is connected to a printer, to receive print data transmitted from a transmitter including at least a display device via a computer network. The computer program product including: a computer readable medium; a first program code unit that causes the computer to transmit user interface data, which is used to display a user interface for allowing a user to input print settings information for the printer, to the transmitter when the computer receives an instruction for starting a transmission process of the print data transmitted from the transmitter; and a second program code unit that causes the computer to receive the print data and the print settings information, which is to be used in a printing process by the printer, when the print data and the print settings information are transmitted from the transmitter, and that causes the printer to print contents represented by the print data according to the print settings information, wherein each of the program code units is registered on the computer readable medium.

A printer driver generally has a first function that gives a user interface for enabling the user to input the print settings information and a second function that carries out a variety of processing operations with respect to the print data and controls the printer, in order to attain the desired printing results, based on the print settings information input by the user.

In the first print data transfer system, the corresponding first transmitter and receiver, the corresponding first method of transferring print data, and the corresponding first and second computer program product, the user interface data for inputting the print settings information is transmitted from the receiver computer (that is, the second computer) to the transmitter computer (that is, the first computer). The transmitter computer accordingly actualizes the first function with the transmitted user interface data. The print settings information is, on the other hand, transmitted together with the print data from the transmitter computer to the receiver computer. The receiver computer accordingly actualizes the second function based on the transmitted print settings information. Even if a printer driver exclusively provided for the printer has not been installed in the transmitter computer, this arrangement enables the printer to print a color image based on the print data or color image data transmitted via the computer network.

In accordance with another aspect, the present invention provides a second print data transfer system includes: a first computer; a second computer connected to the first computer via a computer network; and a printer which is connected to the second computer and prints a color image. In the second print data transfer system, the first computer includes: a color image device; a first memory that stores color image data, which is expressible in a first gamut reproducible by the color image device in a color space, and first color-correction data, which is to be used for converting the color image data expressible in the first gamut into another color image data expressible in a second gamut in the color space; a first transmission unit that transmits and receives data; and a first controller that controls operation of the first computer. The second computer includes: a second memory that stores second color-correction data, which is to be used for converting the color image data expressible in the second gamut into another color image data expressible in a third gamut reproducible by the printer in the color space; a second transmission unit that transmits and receives data; and a second controller that controls operation of the second computer. The first controller reads the first color-correction data and the color image data expressible in the first gamut from the first memory and causes the first transmission unit to send the color image data expressible in the first gamut as print data together with the first color-correction data to the second computer. The second controller reads the second color-correction data from the second memory, carries out a color correction with the first color-correction data and the second color-correction data to convert the color image data expressible in the first gamut into the color image data expressible in the third gamut, and causes the printer to print the color image based on the color-corrected color image data, when receiving the color image data expressible in the first gamut and the first color-correction data via the second transmission unit.

The present invention is also directed to a second transmitter for transmitting print data to a receiver, which is connected to a printer, via a computer network. The transmitter includes: a color image device; a memory that stores color image data, which is expressible in a first gamut reproducible by the color image device in a color space, and color-correction data, which is to be used for converting the color image data expressible in the first gamut into another color image data expressible in a second gamut in the color space; a transmission unit that transmits and receives data; and a controller that controls operation of the transmitter. In the transmitter, the controller reads the color-correction data and the color image data expressible in the first gamut from the memory and causes the transmission unit to send the color image data expressible in the first gamut as print data together with the first color-correction data to the receiver.

The present invention is further directed to a second receiver, which is connected to a printer, for receiving print data from a transmitter including at least a color image device via a computer network. In the transmitter, color image data, which is expressible in a first gamut reproducible by the color image device in a color space, and first color-correction data, which is to be used for converting the color image data expressible in the first gamut into another color image data expressible in a second gamut in the color space, are provided. The receiver includes: a memory that stores second color-correction data, which is to be used for converting the color image data expressible in the second gamut into another color image data expressible in a third gamut reproducible by the printer in the color space; a transmission unit that transmits and receives data; and a controller that controls operation of the receiver. In the receiver, the controller reads the second color-correction data from the memory, carries out a color correction with the first color-correction data and the second color-correction data to convert the color image data expressible in the first gamut into the color image data expressible in the third gamut, and causes the printer to print the color image based on the color-corrected color image data, when receiving the color image data expressible in the first gamut and the first color-correction data transmitted from the transmitter via the transmission unit.

The present invention is also directed to a second method of transferring print data for printing a color image from a first computer including at least a color image device to a second computer, which is connected to a printer, via a computer network. The second method includes the steps of: (a) providing color image data, which is expressible in a first gamut reproducible by the color image device in a color space, and first color-correction data, which is to be used for converting the color image data expressible in the first gamut into another color image data expressible in a second gamut in the color space, in the first computer, and providing second color-correction data, which is to be used for converting the color image data expressible in the second gamut into another color image data expressible in a third gamut reproducible by the printer in the color space, in the second computer; (b) causing the first computer to transmit the color image data expressible in the first gamut as the print data together with the first color-correction data to the second computer; (c) causing the second computer to carry out a color correction with the first color-correction data and the second color-correction data to convert the color image data expressible in the first gamut into the color image data expressible in the third gamut, when the second computer receives the color image data expressible in the first gamut and the first color-correction data; and (d) causing the printer to print a color image based on the color-corrected color image data.

The present invention is also directed to a third computer program product that causes a computer including at least a color image device to transmit print data to a receiver, which is connected to a printer, via a computer network. In the computer, color image data, which is expressible in a first gamut reproducible by the color image device in a color space, and color-correction data, which is to be used for converting the color image data expressible in the first gamut into another color image data expressible in a second gamut in the color space, are provided. The computer program product including: a computer readable medium; and a program code unit that causes the computer to transmit the color image data expressible in the first gamut as the print data together with the color-correction data to the receiver, wherein the program code unit is registered on the computer readable medium.

The present invention is further directed to a fourth computer program product that causes a computer, which is connected to a printer, to receive print data transmitted from a transmitter including at least a color image device via a computer network. In the transmitter, color image data, which is expressible in a first gamut reproducible by the color image device in a color space, and first color-correction data, which is to be used for converting the color image data expressible in the first gamut into another color image data expressible in a second gamut in the color space, are provided. In the computer, second color-correction data, which is to be used for converting the color image data expressible in the second gamut into another color image data expressible in a third gamut reproducible by the printer in the color space, is provided. The computer program product including: a computer readable medium; a first program code unit that causes the computer to receive the color image data expressible in the first gamut and the first color-correction data when the color image data expressible in the first gamut and the first color-correction data are transmitted from the transmitter; a second program code unit that causes the computer to carry out a color correction with the first color-correction data and the second color-correction data to convert the color image data expressible in the first gamut into the color image data expressible in the third gamut; and a third program code unit that causes the printer to print a color image based on the color-corrected color image data, wherein each of the program code units is registered on the computer readable medium.

Available examples of the color image device include a monitor for displaying color images, a scanner for reading color images, a digital camera for obtaining color images by shooting, and other devices dealing with color images.

In the second print data transfer system, the corresponding second transmitter and receiver, the corresponding second method of transferring print data, and the corresponding third and fourth computer program product, the color-correction data relating to the color image device is transmitted together with the color image data from the transmitter computer (that is, the first computer) to the receiver computer (that is, the second computer). The receiver computer then carries out an appropriate color correction of the color image data using the transmitted color-correction data relating to the color image device. Even if a printer driver exclusively provided for the printing unit has not been installed in the transmitter computer, this arrangement enables the tints of the color image printed by the printer to be as close as possible to the tints of the color image dealt with the color image device. This arrangement accordingly enables the printer connected to the receiver computer to print a color image with the tints desired by the user of the transmitter computer.

In accordance with still another aspect, the present invention provides a third print data transfer system includes: a first computer; a second computer connected to the first computer via a computer network; and a printer which is connected to the second computer and prints a color image. In the third print data transfer system, the first computer includes: a color image device; a first memory that stores color image data, which is expressible in a first gamut reproducible by the color image device in a color space, and first color-correction data, which is to be used for converting the color image data expressible in the first gamut into another color image data expressible in a second gamut in the color space; a first transmission unit that transmits and receives data; and a first controller that controls operation of the first computer. The second computer includes: a second memory that stores second color-correction data, which is to be used for converting the color image data expressible in the second gamut into another color image data expressible in a third gamut reproducible by the printer in the color space; a second transmission unit that transmits and receives data; and a second controller that controls operation of the second computer. The first controller causes the first transmission unit to send a requirement for transfer of color-correction data to the second computer. The second controller reads the second color-correction data from the second memory and causes the second transmission unit to send the second color-correction data to the first computer, when receiving the requirement for transfer. The first controller reads the first color-correction data and the color image data expressible in the first gamut from the first memory, carries out a color correction with the first color-correction data and the second color-correction data to convert the color image data expressible in the first gamut into the color image data expressible in the third gamut, and causes the first transmission unit to send the color-corrected color image data as print data to the second computer, when receiving the second color-correction data via the first transmission unit. The second controller causes the printer to print the color image based on the color-corrected color image data, when receiving the color-corrected color image data via the second transmission unit.

The present invention is also directed to a third transmitter for transmitting print data to a receiver, which is connected to a printer, via a computer network. The transmitter includes: a color image device; a memory that stores color image data, which is expressible in a first gamut reproducible by the color image device in a color space, and first color-correction data, which is to be used for converting the color image data expressible in the first gamut into another color image data expressible in a second gamut in the color space; a transmission unit that transmits and receives data; and a controller that controls operation of the transmitter. In the receiver, second color-correction data, which is to be used for converting the color image data expressible in the second gamut into another color image data expressible in a third gamut reproducible by the printer in the color space, is provided. In the transmitter, the controller causes the transmission unit to send a requirement for transfer of color-correction data to the receiver. The controller reads the first color-correction data and the color image data expressible in the first gamut from the memory, carries out a color correction with the first color-correction data and the second color-correction data to convert the color image data expressible in the first gamut into the color image data expressible in the third gamut, and causes the transmission unit to send the color-corrected color image data as print data to the second computer, when receiving the second color-correction data transmitted from the receiver via the transmission unit.

The present invention is further directed to a third receiver, which is connected to a printer, for receiving print data from a transmitter including at least a color image device via a computer network. In the transmitter, color image data, which is expressible in a first gamut reproducible by the color image device in a color space, and first color-correction data, which is to be used for converting the color image data expressible in the first gamut into another color image data expressible in a second gamut in the color space, are provided. The receiver includes: a memory that stores second color-correction data, which is to be used for converting the color image data expressible in the second gamut into another color image data expressible in a third gamut reproducible by the printer in the color space; a transmission unit that transmits and receives data; and a controller that controls operation of the receiver. In the receiver, the controller reads the second color-correction data from the memory and causes the transmission unit to send the second color-correction data to the transmitter, when receiving the requirement for transfer of color-correction data transmitted from the transmitter via the transmission unit. After the transmitter carries out a color correction with the first color-correction data and the second color-correction data to convert the color image data expressible in the first gamut into the color image data expressible in the third gamut, the controller receives the color-corrected color image data transmitted from the transmitter via the transmission unit. The controller causes the printer to print the color image based on color-corrected color image data.

The present invention is also directed to a third method of transferring print data for printing a color image from a first computer including at least a color image device to a second computer, which is connected to a printer, via a computer network. The third method includes the steps of: (a) providing color image data, which is expressible in a first gamut reproducible by the color image device in a color space, and first color-correction data, which is to be used for converting the color image data expressible in the first gamut into another color image data expressible in a second gamut in the color space, in the first computer, and providing second color-correction data, which is to be used for converting the color image data expressible in the second gamut into another color image data expressible in a third gamut reproducible by the printer in the color space, in the second computer; (b) causing the first computer to transmit a requirement for transfer of color-correction data to the second computer; (c) causing the second computer to transmit the second color-correction data to the first computer, when the second computer receives the requirement for transfer;

(d) causing the first computer to carry out a color correction with the first color-correction data and the second color-correction data to convert the color image data expressible in the first gamut into the color image data expressible in the third gamut, when the first computer receives the second color-correction data; (e) causing the first computer to transmit the color-corrected color image data as the print data to the second computer; and (f) causing the printer to print a color image based on the color-corrected color image data, when the second computer receives the color-corrected color image data.

The present invention is also directed to a fifth computer program product that causes a computer including at least a color image device to transmit print data to a receiver, which is connected to a printer, via a computer network. In the computer, color image data, which is expressible in a first gamut reproducible by the color image device in a color space, and first color-correction data, which is to be used for converting the color image data expressible in the first gamut into another color image data expressible in a second gamut in the color space, are provided. In the receiver, second color-correction data, which is to be used for converting the color image data expressible in the second gamut into another color image data expressible in a third gamut reproducible by the printer in the color space, is provided. The computer program product including: a computer readable medium; a first program code unit that causes the computer to transmit a requirement for transfer of color-correction data to the receiver; a second program code unit that causes the computer to receive the second color-correction data when the second color-correction data is transmitted from the receiver; a third program code unit that causes the computer to carry out a color correction with the first color-correction data and the second color-correction data to convert the color image data expressible in the first gamut into the color image data expressible in the third gamut; and a fourth program code unit that causes the computer to transmit the color-corrected color image data as the print data to the receiver, wherein each of the program code units is registered on the computer readable medium.

The present invention is further directed to a sixth computer program product that causes a computer, which is connected to a printer, to receive print data transmitted from a transmitter including at least a color image device via a computer network. In the transmitter, color image data, which is expressible in a first gamut reproducible by the color image device in a color space, and first color-correction data, which is to be used for converting the color image data expressible in the first gamut into another color image data expressible in a second gamut in the color space, are provided. In the computer, second color-correction data, which is to be used for converting the color image data expressible in the second gamut into another color image data expressible in a third gamut reproducible by the printer in the color space, is provided. The computer program product including: a computer readable medium; a first program code unit that causes the computer to transmit the second color-correction data when the computer receives a requirement for transfer of color-correction data transmitted from the transmitter; a second program code unit that, after the transmitter carries out a color correction with the first color-correction data and the second color-correction data to convert the color image data expressible in the first gamut into the color image data expressible in the third gamut, causes the computer to receive the color-corrected color image data transmitted from the transmitter; and a third program code unit that causes the printer to print a color image based on the color-corrected color image data, wherein each of the program code units is registered on the computer readable medium.

In the third print data transfer system, the corresponding third transmitter and receiver, the corresponding third method of transferring print data, and the corresponding fifth and sixth computer program product, the color-correction data relating to the printer is transmitted from the receiver computer (that is, the second computer) to the transmitter computer (that is, the first computer). The transmitter computer then carries out an appropriate color correction of the color image data using the transmitted color-correction data relating to the printer. The color-corrected color image data is subsequently transferred to the receiver computer, so that the printer in the receiver computer prints a color image based on the processed color image data. Even if a printer driver exclusively provided for the printer has not been installed in the transmitter computer, this arrangement enables the tints of the color image printed by the printer to be as close as possible to the tints of the color image dealt with the color image device. This arrangement accordingly enables the printer connected to the receiver computer to print a color image with the tints desired by the user of the transmitter computer.

In accordance with another aspect, the present invention provides a fourth print data transfer system includes: a first computer; a second computer connected to the first computer via a computer network; and a printer which is connected to the second computer and prints a color image.

In the fourth print data transfer system, the first computer includes: a color image device; a first memory that stores color image data, which is expressible in a first gamut reproducible by the color image device in a color space, and first color-correction data, which is to be used for converting the color image data expressible in the first gamut into another color image data expressible in a second gamut in the color space; a first transmission unit that transmits and receives data; and a first controller that controls operation of the first computer. The second computer includes: a second memory that stores second color-correction data, which is to be used for converting the color image data expressible in the second gamut into another color image data expressible in a third gamut reproducible by the printer in the color space; a second transmission unit that transmits and receives data; and a second controller that controls operation of the second computer. The first controller reads the first color-correction data and the color image data expressible in the first gamut from the first memory, carries out a first color correction with the first color-correction data to convert the color image data expressible in the first gamut into the color image data expressible in the second gamut, and causes the first transmission unit to send the color image data after the first color correction as print data to the second computer. The second controller reads the second color-correction data from the second memory, carries out a second color correction with the second color-correction data to convert the color image data expressible in the second gamut after the first color correction into the color image data expressible in the third gamut, and causes the printer to print the color image based on the color image data after the second color correction, when receiving the color image data after the first color correction via the second transmission unit.

The present invention is also directed to a third transmitter for transmitting print data to a receiver, which is connected to a printer, via a computer network. The transmitter includes: a color image device; a memory that stores color image data, which is expressible in a first gamut reproducible by the color image device in a color space, and color-correction data, which is to be used for converting the color image data expressible in the first gamut into another color image data expressible in a second gamut in the color space; a transmission unit that transmits and receives data; and a controller that controls operation of the transmitter. The controller reads the color-correction data and the color image data expressible in the first gamut from the memory, carries out a first color correction with the color-correction data to convert the color image data expressible in the first gamut into the color image data expressible in the second gamut, and causes the transmission unit to send the color-corrected image data as print data to the receiver.

The present invention is further directed to a third receiver, which is connected to a printer, for receiving print data from a transmitter including at least a color image device via a computer network. In the transmitter, color image data, which is expressible in a first gamut reproducible by the color image device in a color space, and first color-correction data, which is to be used for converting the color image data expressible in the first gamut into another color image data expressible in a second gamut in the color space, are provided. The receiver includes: a memory that stores second color-correction data, which is to be used for converting the color image data expressible in the second gamut into another color image data expressible in a third gamut reproducible by the printer in the color space; a transmission unit that transmits and receives data; and a controller that controls operation of the receiver. In the receiver, after the transmitter carries out a first color correction with the first color-correction data to convert the color image data expressible in the first gamut into the color image data expressible in the second gamut, the controller receives the color image data after the first color correction, which is transmitted from the transmitter, via the transmission unit. The controller carries out a second color correction with the second color-correction data to convert the color image data expressible in the second gamut after the first color correction into the color image data expressible in the third gamut. The controller causes the printer to print a color image based on the color image data after the second color correction.

The present invention is also directed to a fourth method of transferring print data for printing a color image from a first computer including at least a color image device to a second computer, which is connected to a printer, via a computer network. The fourth method includes the steps of: (a) providing color image data, which is expressible in a first gamut reproducible by the color image device in a color space, and first color-correction data, which is to be used for converting the color image data expressible in the first gamut into another color image data expressible in a second gamut in the color space, in the first computer, and providing second color-correction data, which is to be used for converting the color image data expressible in the second gamut into another color image data expressible in a third gamut reproducible by the printer in the color space, in the second computer; (b) causing the first computer to carry out a first color correction with the first color-correction data to convert the color image data expressible in the first gamut into the color image data expressible in the second gamut; (c) causing the first computer to transmit the color image data after the first color correction as the print data to the second computer; (d) causing the second computer to carry out a second color correction with the second color-correction data to convert the color image data expressible in the second gamut after the first color correction into the color image data expressible in the third gamut, when the second computer receives the color image data after the first color correction; and (e) causing the printer to print a color image based on the color image data after the second color correction.

The present invention is also directed to a seventh computer program product that causes a computer including at least a color image device to transmit print data to a receiver, which is connected to a printer, via a computer network. In the computer, color image data, which is expressible in a first gamut reproducible by the color image device in a color space, and color-correction data, which is to be used for converting the color image data expressible in the first gamut into another color image data expressible in a second gamut in the color space, are provided. The computer program product including: a computer readable medium; a first program code unit that causes the computer to carry out a color correction with the color-correction data to convert the color image data expressible in the first gamut into the color image data expressible in the second gamut; and a second program code unit that causes the computer to transmit the color-corrected color image data as the print data to the transmitter, wherein each of the program code units is registered on the computer readable medium.

The present invention is further directed to a eighth computer program product that causes a computer, which is connected to a printer, to receive print data transmitted from a transmitter including at least a color image device via a computer network. In the transmitter, color image data, which is expressible in a first gamut reproducible by the color image device in a color space, and first color-correction data, which is to be used for converting the color image data expressible in the first gamut into another color image data expressible in a second gamut in the color space, are provided. In the computer, second color-correction data, which is to be used for converting the color image data expressible in the second gamut into another color image data expressible in a third gamut reproducible by the printer in the color space, is provided. The computer program product including: a computer readable medium; a first program code unit that, after the transmitter carries out a first color correction with the first color-correction data to convert the color image data expressible in the first gamut into the color image data expressible in the second gamut, causes the computer to receive the color image data after the first color correction, which is transmitted from the transmitter; a second program code unit that causes the computer to carry out a second color correction with the second color-correction data to convert the color image data expressible in the second gamut after the first color correction into the color image data expressible in the third gamut; and a third program code unit that causes the printer to print a color image based on the color image data after the second color correction, wherein each of the program code units is registered on the computer readable medium.

In the third print data transfer system, the corresponding third transmitter and receiver, the corresponding third method of transferring print data, and the corresponding fifth and sixth computer program product, the transmitter computer (that is, the first computer) carries out an appropriate color correction of the color image data using the color-correction data relating to the color image device. The receiver computer (that is, the second computer) subsequently carries out an appropriate color correction of the color image data using the color-correction data relating to the printer. Even if a printer driver exclusively provided for the printer has not been installed in the transmitter computer, this arrangement enables the tints of the color image printed by the printer to be as close as possible to the tints of the color image dealt with the color image device. This arrangement accordingly enables the printer in the receiver computer to print a color image with the tints desired by the user of the transmitter computer.

These and other objects, features, aspects, and advantages of the present invention will become more apparent from the following detailed description of the preferred embodiments with the accompanying drawings.

BRIEF DESCRIPTION OF THE DRAWINGS

FIG. 10 is a flowchart showing an essential part of the processing routine executed in the print data transfer system of the third embodiment shown in FIG. 9.

DESCRIPTION OF THE PREFERRED EMBODIMENTS

Figure 1:
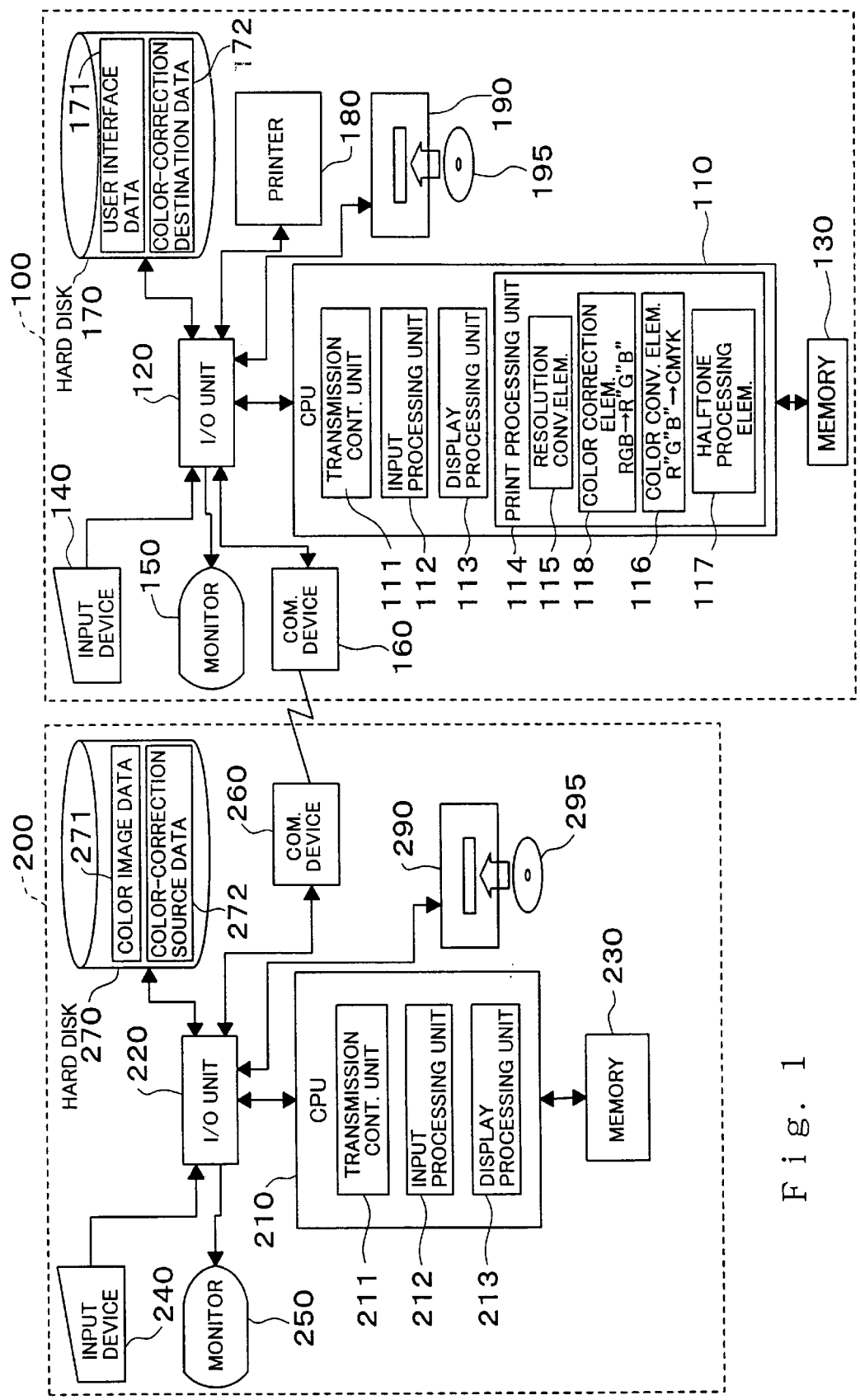
FIG. 1 is a block diagram illustrating the structure of a print data transfer system as a first embodiment according to the present invention.
Figure 2:
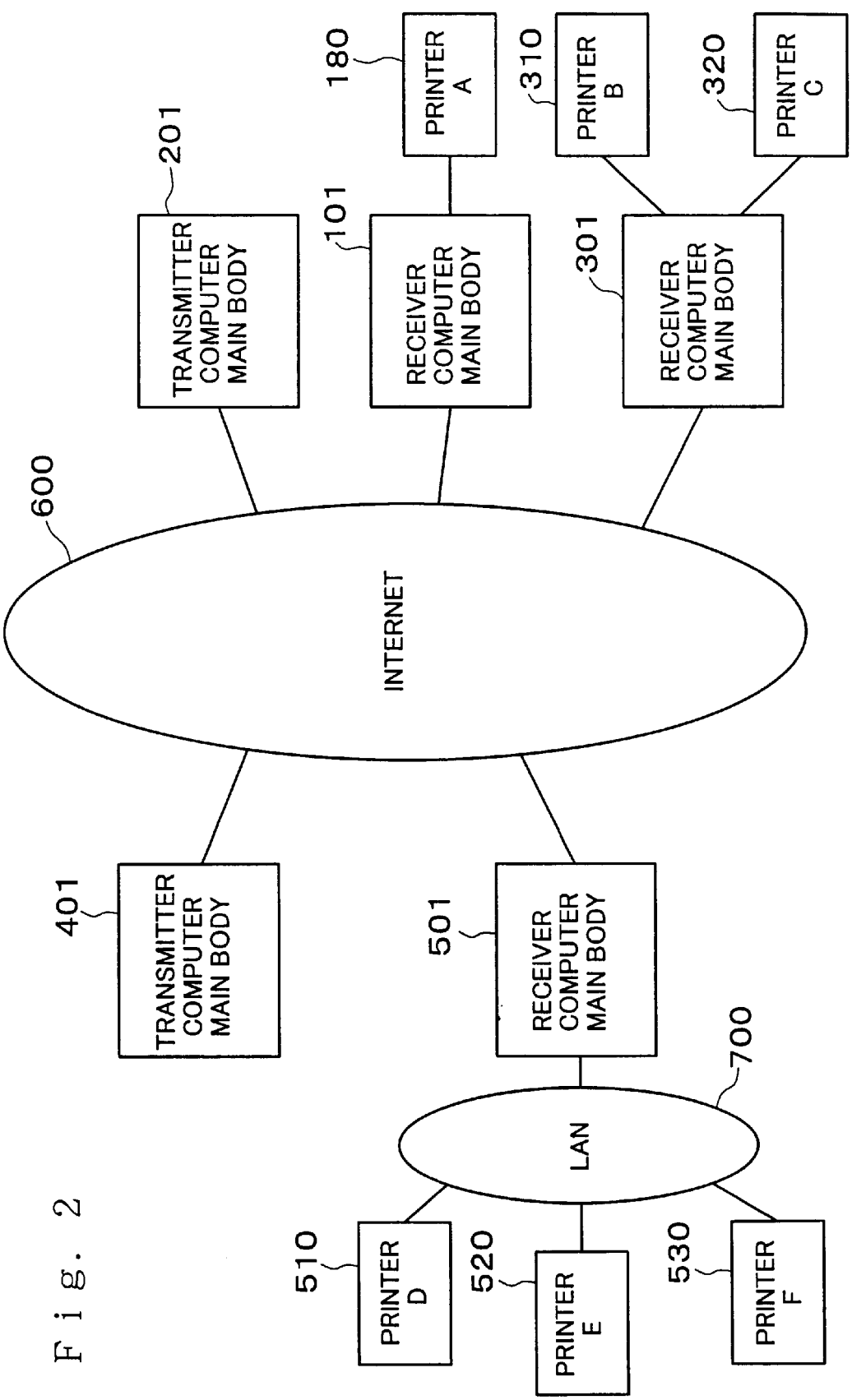
FIG. 2 shows an example of the print data transfer system of FIG. 1 actualized on the Internet.

FIG. 1 is a block diagram illustrating the structure of a print data transfer system as a first embodiment according to the present invention. FIG. 2 shows an example of the print data transfer system of FIG. 1 actualized on the Internet.

The print data transfer system of this embodiment includes a receiver computer 100 that receives print data and a transmitter computer 200 that transmits print data.

Referring to FIG. 1, the receiver computer 100 is provided with a CPU 110 that executes a variety of processing and control operations according to computer programs, an I/O unit 120 that transmits data from and to a variety of peripheral devices, and a memory 130 that stores the computer programs and temporarily registers the data in the course of the processing. The receiver computer 100 further has an input device 140 that includes a keyboard, a mouse, and a tablet and is used to input instructions and other data specified by the user, a monitor 150, such as a CRT or a liquid-crystal display, which is used to display the contents of the data, and a communications device 160 that includes a modem, a terminal adapter, and a network card and is used for communication with another apparatus via a network. The receiver computer 100 also includes a hard disk 170, in which a variety of data are stored, a printer 180 that is used to print the contents of print data or color image data (for example, color images), and a CD-ROM drive 190.

The CPU 110 executes the operations according to the computer programs to function as a transmission control unit 111, an input processing unit 112, a display processing unit 113, and a print processing unit 114. The print processing unit 114 further includes a resolution conversion element 115, a color correction element 118, a color conversion element 116, and a halftone processing element 117. User interface data 171 and color-correction destination data 172 have been stored in advance in the hard disk 170. The user interface data 171 is used to display a user interface for inputting print settings information corresponding to the printer 180, whereas the color-correction destination data 172 is used in the process of color correction of the print data or the color image data.

Like the receiver computer 100, the transmitter computer 200 includes a CPU 210, an I/O unit 220, a memory 230, an input device 240, a monitor 250, a communications device 260, a hard disk 270, and a CD-ROM drive 290.

The CPU 210 also executes the operations according to computer programs to function as a transmission control unit 211, an input processing unit 212, and a display processing unit 213. Color image data 271, which is the print data to be transmitted, and color-correction source data 272, which is used in the process of color correction of the print data or the color image data 271, have been stored in advance in the hard disk 270.

The color image data 271 stored in the hard disk 270 is identical with color image data used in the monitor 250 (that is, color image data expressible in a gamut reproducible by the monitor 250 as discussed later), and, for example, consists of bit-map data of gray scales of R, G, and B.

The following describes the color-correction data 172 and 272 that are used in the process of color correction. In general, a gamut reproducible by a monitor has different size and position in a color space from those of a gamut reproducible by a printer. The colors reproducible by the monitor may thus be non-reproducible by the printer, and on the contrary, the colors non-reproducible by the monitor may be reproducible by the printer. When a color image displayed on the monitor is printed by the printer without any processing, the resulting printed color image may have different tints from those of the color image displayed on the monitor.

In order to make the tints of the printed color image as close as possible to the tints of the color image displayed on the monitor, a typical procedure carries out a color correction (that is a color matching operation) with respect to the color image data used for displaying a color image on the monitor and causes the printer to print a color image based on the color-corrected color image data.

A concrete procedure of the color correction is described here. The color image data here is, for example, RGB data. A virtual color image device is provided, which has an ideal gamut in the color space as a reproducible range. The procedure carries out RGB-to-R'G'B' color conversion from color image data RGB that is expressible in the gamut reproducible by the monitor (that is, the color image data used in the monitor) into color image data R'G'B' that is expressible in the gamut reproducible by the virtual color image device, according to the color-correction source data (that is, the profile for the monitor). The procedure then carries out R'G'B'-to-R"G"B" color conversion from the color image data R'G'B' that is expressible in the gamut reproducible by the virtual color image device into color image data R"G"B" that is expressible in the gamut reproducible by the printer (that is, the color image data used in the printer), according to the color-correction destination data (that is, the profile for the printer).

The color-correction source data (the profile for the monitor) is used for the conversion in the color space, which maps all the colors existing in the gamut reproducible by the monitor into the gamut reproducible by the virtual color image device. The color-correction destination data (the profile for the printer) is used for the conversion in the color space, which maps all the colors existing in the gamut reproducible by the virtual color image device into the gamut reproducible by the printer.

The concrete procedure discussed above converts the color image data RGB into the color image data R'G'B' according to the color-correction source data and further converts the color image data R'G'B' into the color image data R"G"B" according to the color-correction destination data. The color-correction data may be expressed as matrix data. Another possible procedure may thus convert the color image data RGB directly into the color image. data R"G"B" without the intermediate color image data R'G'B', according to the color-correction source data and the color-correction destination data.

The color-correction data discussed above are adopted in this embodiment. The color-correction source data 272 stored in the hard disk 270 of the transmitter computer 200 is the profile for the monitor 250, which is used in the process of conversion from the color image data RGB expressible in the gamut reproducible by the monitor 250 in the transmitter computer 200 (that is, the color image data used for the monitor 250) into the color image data R'G'B' expressible in the gamut reproducible by the virtual color image device. The color-correction destination data 172 stored in the hard disk 170 of the receiver computer 100 is the profile for the printer 180, which is used in the process of conversion from the color image data R'G'B' expressible in the gamut reproducible by the virtual color image device into the color image data R"G"B" expressible in the gamut reproducible by the printer 180 in the receiver computer 100 (that is, the color image data used for the printer 180).

The color-correction source data 272 are varied by a display resolution of the monitor 250 and other parameters. In a similar manner, the color-correction destination data 172 are varied by a printing resolution of the printer 180, a halftone processing method, a color correction method, and other parameters. Plural pieces of the color-correction source data 272 are thus provided corresponding to these parameters and stored in the hard disk 270, whereas plural pieces of the color-correction destination data 172 are provided corresponding to the related parameters and stored in the hard disk 170.

In this embodiment, the receiver computer 100 and the transmitter computer 200 shown in FIG. 1 are connected to each other via the Internet 600 as shown in FIG. 2. In the example of FIG. 2, a receiver computer main body 101 and a printer A (180) represent the receiver computer 100, whereas a transmitter computer main body 201 represents the transmitter computer 200. In this embodiment, the computer main body consists of, for example, the CPU, the memory, the I/O unit, the communications device, and the hard disk shown in FIG. 1. The input device, the monitor, and the printer are accordingly not included in the computer main body. Among these constituents, the input device and the monitor are omitted from the illustration of FIG. 2.

Another transmitter computer main body 401 and other receiver computer main bodies 301 and 501 are also connected to the Internet. Two printers, a printer B (310) and a printer C (320), are connected to the receiver computer main body 301. Three computers, a printer D (510), a printer E (520), and a printer F (530), are connected to the receiver computer main body 501 via a LAN (local area network) 700.

In this embodiment, the six printers, the printers A through F, may be used to print the contents represented by the print data, which is transmitted from the transmitter computer main body 201 or 401 via the Internet 600, as clearly understood from the illustration of FIG. 2.

In this embodiment, as discussed previously, the computer main body consists of the CPU, the memory, the I/O unit, the communications device, and the hard disk. The input device, the monitor, the printer, and the other peripheral elements may, however, be included in or integrated with the computer main body.

Although the respective computer main bodies are directly connected to the Internet in the illustration of FIG. 2, these computers are, in many cases, indirectly connected to the Internet 600 via a telephone communication network, a LAN, or another network.

As described above, in the receiver computer 100, the CPU 110 operates according to the computer programs, so as to function as the transmission control unit 111, the input processing unit 112, the display processing unit 113, and the print processing unit 114. In the transmitter computer 200, the CPU 210 operates according to the computer programs, so as to function as the transmission control unit 211, the input processing unit 212, and the display processing unit 213. In this embodiment, these computer programs are recorded in the recording media, CD-ROMs 195 and 295, and read by the CD-ROM drives 190 and 290 to be input into the receiver computer 100 and the transmitter computer 200. The input computer programs are transferred to the respective hard disks 170 and 270 and further to the memories 130 and 230, for example, at the starting time.

In this embodiment, the CD-ROMs are utilized as the recording media, on which the computer programs are recorded in a computer readable manner. Other available examples of the recording media include flexible disks, magneto-optic discs, IC cards, ROM cartridges, punched cards, prints on which barcodes or other codes are printed, internal storage devices (memories such as a RAM and a ROM) and external storage devices of the computer, and a variety of other computer readable media.

Instead of being provided in the form recorded in such recording media, the computer programs may be supplied from a program server (not shown) into the receiver computer 100 and the transmitter computer 200 via a network.

Part of the above computer programs may be constructed as the operating system.

In this embodiment, the transmission control unit 111, the input processing unit 112, the display processing unit 113, and the print processing unit 114 in the receiver computer 100 and the transmission control unit 211, the input processing unit 212, and the display processing unit 213 in the transmitter computer 200 are actualized by the software. These functions may, however, be actualized by the hardware.

These modifications are also applicable to second and third embodiments of the present invention described later.

Figure 3:
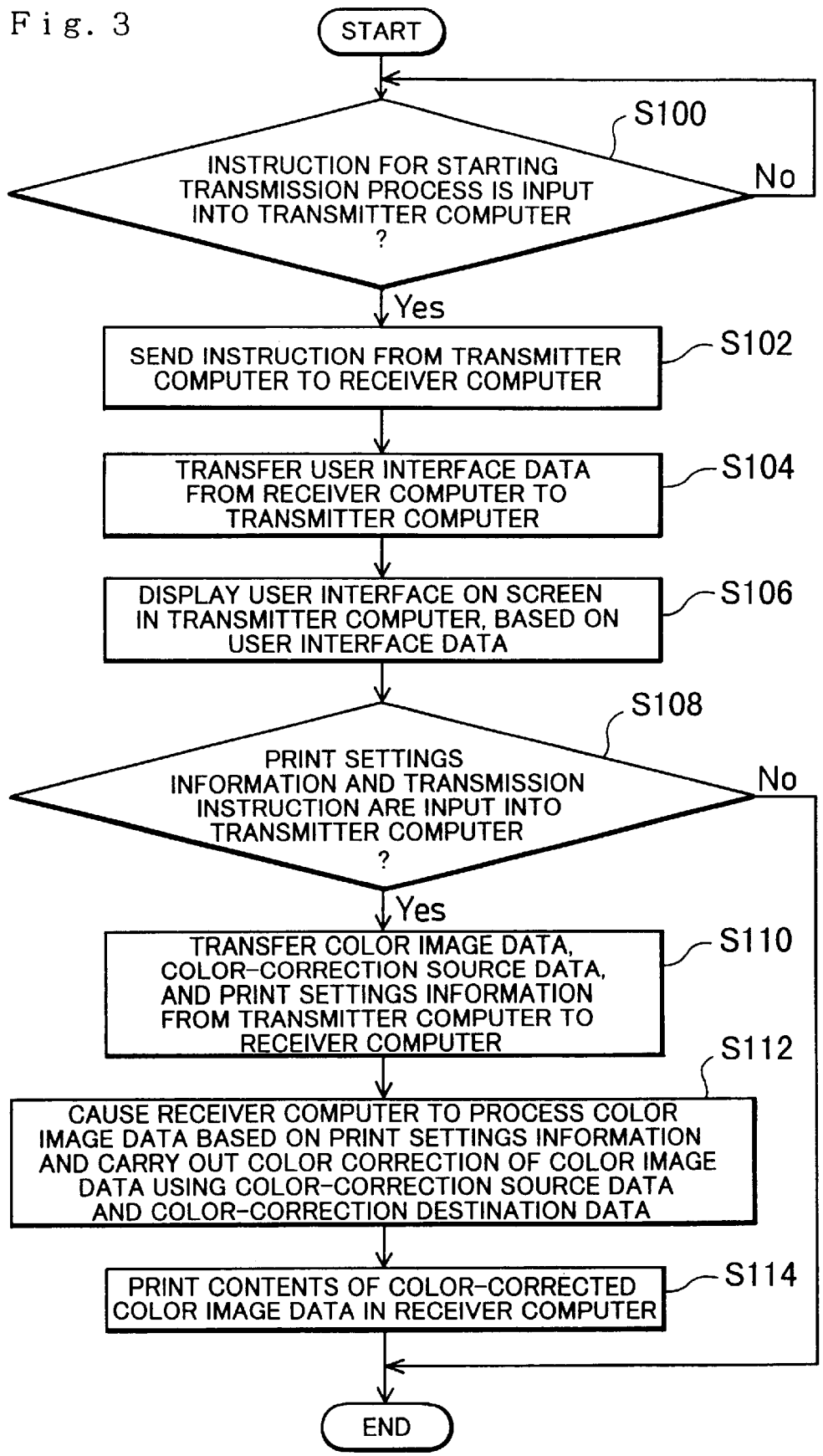
FIG. 3 is a flowchart showing a processing routine executed in the print data transfer system of the first embodiment shown in FIG. 1.

FIG. 3 is a flowchart showing a processing routine executed in the print data transfer system of FIG. 1. The operation of this embodiment is described below with the flowchart of FIG. 3.

Referring to the flowchart of FIG. 3, the CPU 210 of the transmitter computer 200 determines whether or not the user has input an instruction for starting a transmission process of print data or color image data into the transmitter computer 200 at step S100. The CPU 210 waits for an input of the instruction for starting the transmission process. When the user of the transmitter computer 200 inputs the instruction for starting the transmission process of color image data through operation of the input device 240, the input processing unit 212 transfers the instruction to the transmission control unit 211. The transmission control unit 211 makes communications with the receiver computer 100, to which the color image data is to be transmitted, via the communications device 260, and transmits the input instruction for starting the transmission process to the receiver computer 100 at step S102.

According to one exemplified procedure discussed below with the drawing of FIG. 4, the user of the transmitter computer 200 may input the instruction for starting the transmission process of color image data.

Figure 4:
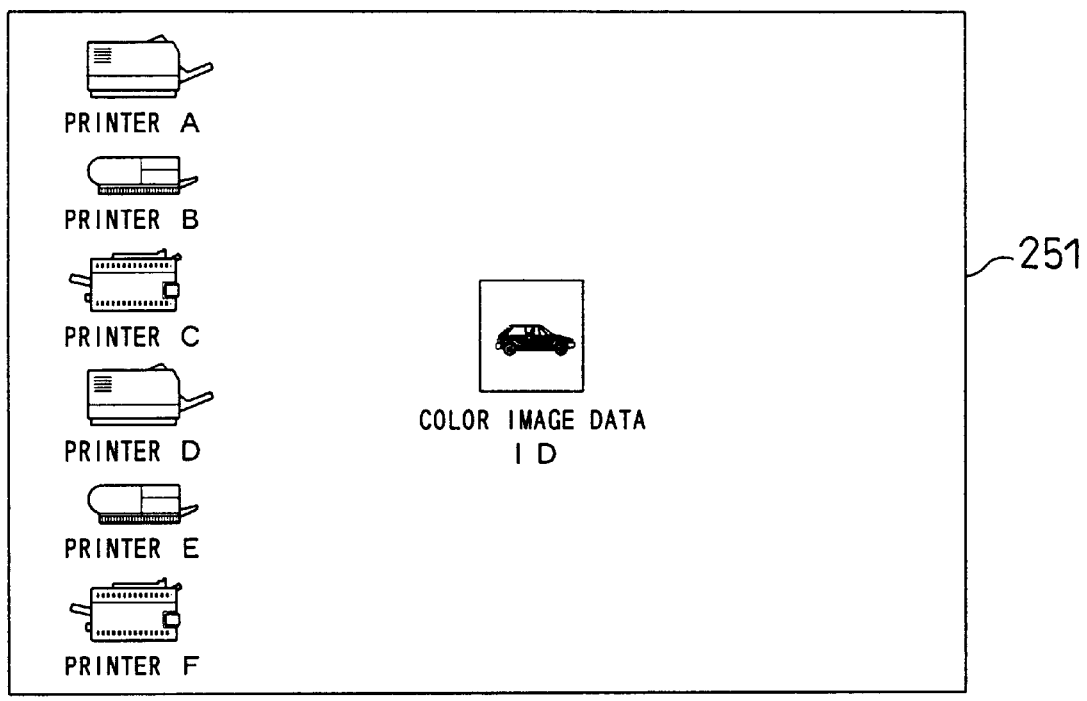
FIG. 4 shows icons displayed on the screen of the monitor 250 in the transmitter computer 200 of FIG. 1.

FIG. 4 shows icons displayed on the screen of the monitor 250 in the transmitter computer 200 of FIG. 1.

As described previously, the six printers shown in FIG. 2, the printers A through F, can be used to print a color image, that is, the contents represented by the print data or color image data, which is transmitted from the transmitter computer 200. As shown in FIG. 4, icons representing the six available printers A through F are displayed on a display screen 251 of the monitor 250 in the transmitter computer 200. The color image data 271 is stored in the hard disk 270 of the transmitter computer 200. An icon representing the registered color image data 271 is displayed as an icon of color image data ID in the display screen 251 of the monitor 250 as shown in FIG. 4. The display processing unit 213 of the CPU 210 transmits the display data of these icons to the monitor 250 via the I/O unit 220.

The user of the transmitter computer 200 selects one among the six printers A through F to be used for printing the contents of the color image data ID in the display screen 251. In this embodiment, for example, the printer A (180) is selected as the printer used for printing. The user drags the ion of color image data ID displayed in the display screen 251 of the monitor 250 with the input device 240, for example, a mouse, and drops the dragged icon of color image data ID on the icon of the selected printer A. The input processing unit 212 then determines that the instruction for starting the transmission process has been input, and transmits the instruction to the transmission control unit 211 as described previously, in order to transmit the color image data to the receiver computer 100, with which the printer A (180) is connected, and cause the printer A to print the contents of the color image data ID.

In this manner, the user of the transmitter computer 200 can give the instruction for starting the transmission process of the color image data ID.

Although the icons representing the respective available printers are displayed in the example of FIG. 4, icons representing the computers, to which the available printers are connected, may be displayed instead.

In the receiver computer 100, when the communications device 160 receives the transmitted instruction for starting the transmitting process, the transmission control unit 111 of the CPU 110 reads the user interface data 171 from the hard disk 170 and transmits the user interface data 171 to the transmitter computer 200 via the communications device 160 at step S104. As mentioned previously, the user interface data 171 is used to display a user interface for inputting the print settings information corresponding to the printer A (180) connected to the receiver computer 100.

In this embodiment, the user interface data provided in the receiver computer 100 is not only for the transmitter computer 200 but generally for a large number of transmitter computers (for example, the transmitter computer main body 401 shown in FIG. 2) connected to the Internet 600. The user interface data thus mainly consists of HTML data written in HTML.

The Internet 600 is in the environment where different machine types coexist. It is accordingly difficult for the receiver computer 100 to identify the machine type of each transmitter computer connected to the Internet 600. In the case where the user interface data is created according to a program that depends upon a specific machine type and is supplied to the respective transmitter computers, some transmitter computers can not naturally utilize the user interface data. It is, however, practically impossible to provide the user interface data for each machine type and supply the user interface data suitable for the machine type of each transmitter computer. This embodiment accordingly creates the user interface data by utilizing the HTML that does not depend upon any specific machine type and facilitates creation of the data.

The user interface data may be written in a computer language that does not depend upon any specific machine type, for example, JAVA, instead of the HTML.

In the transmitter computer 200, when the communications device 260 receives the transmitted user interface data, the transmission control unit 211 stores the user interface data into the hard disk 270, while the display processing unit 213 displays a user interface for inputting the print settings information on the display screen of the monitor 250, based on the user interface data at step S106. As mentioned above, the user interface data is HTML data and thus readily displayed by using a known Web browser software.

Figure 5:
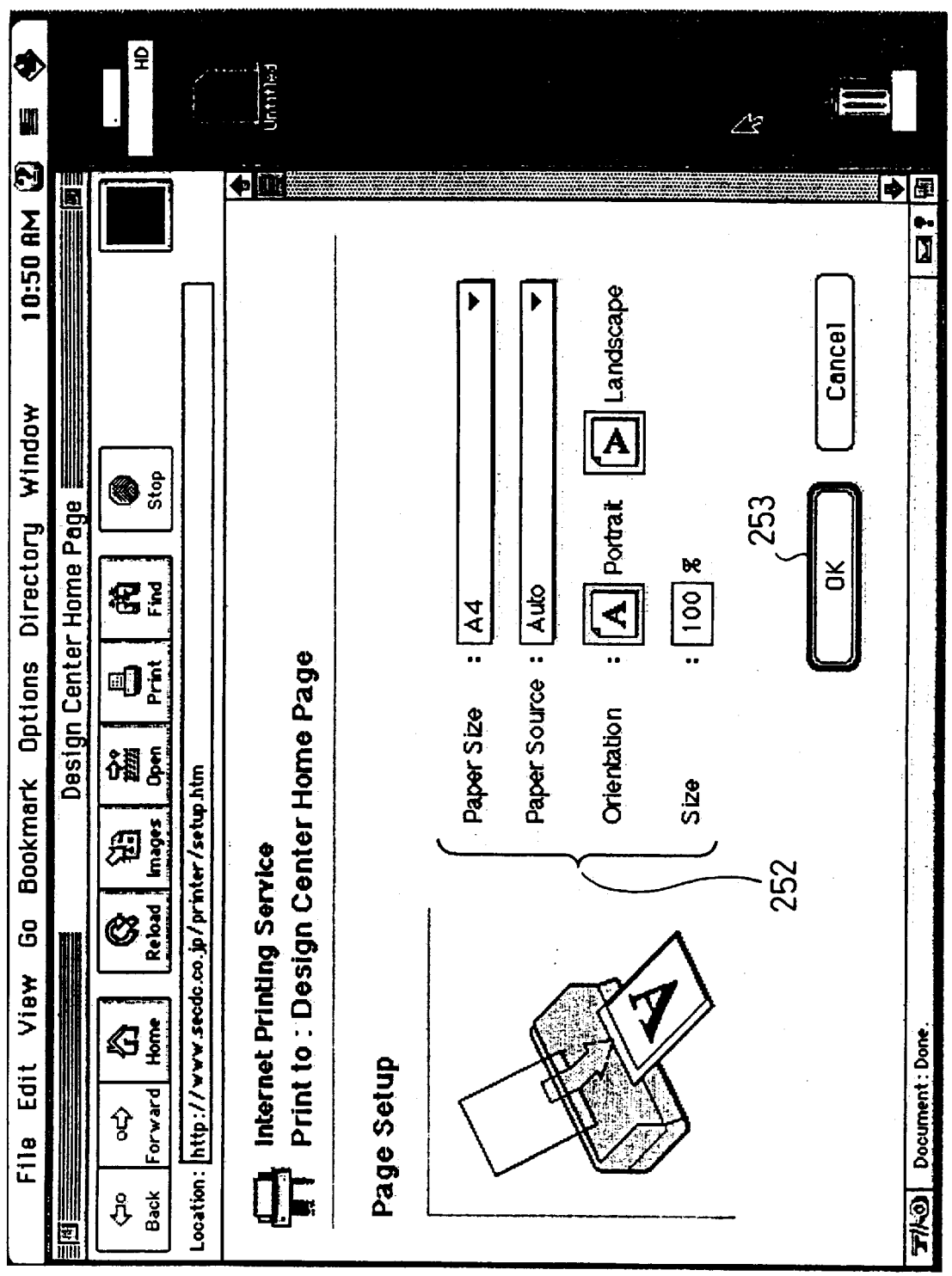
FIG. 5 shows an exemplified user interface for inputting print settings information displayed on the screen of the monitor 250, based on the user interface data.
Figure 6:
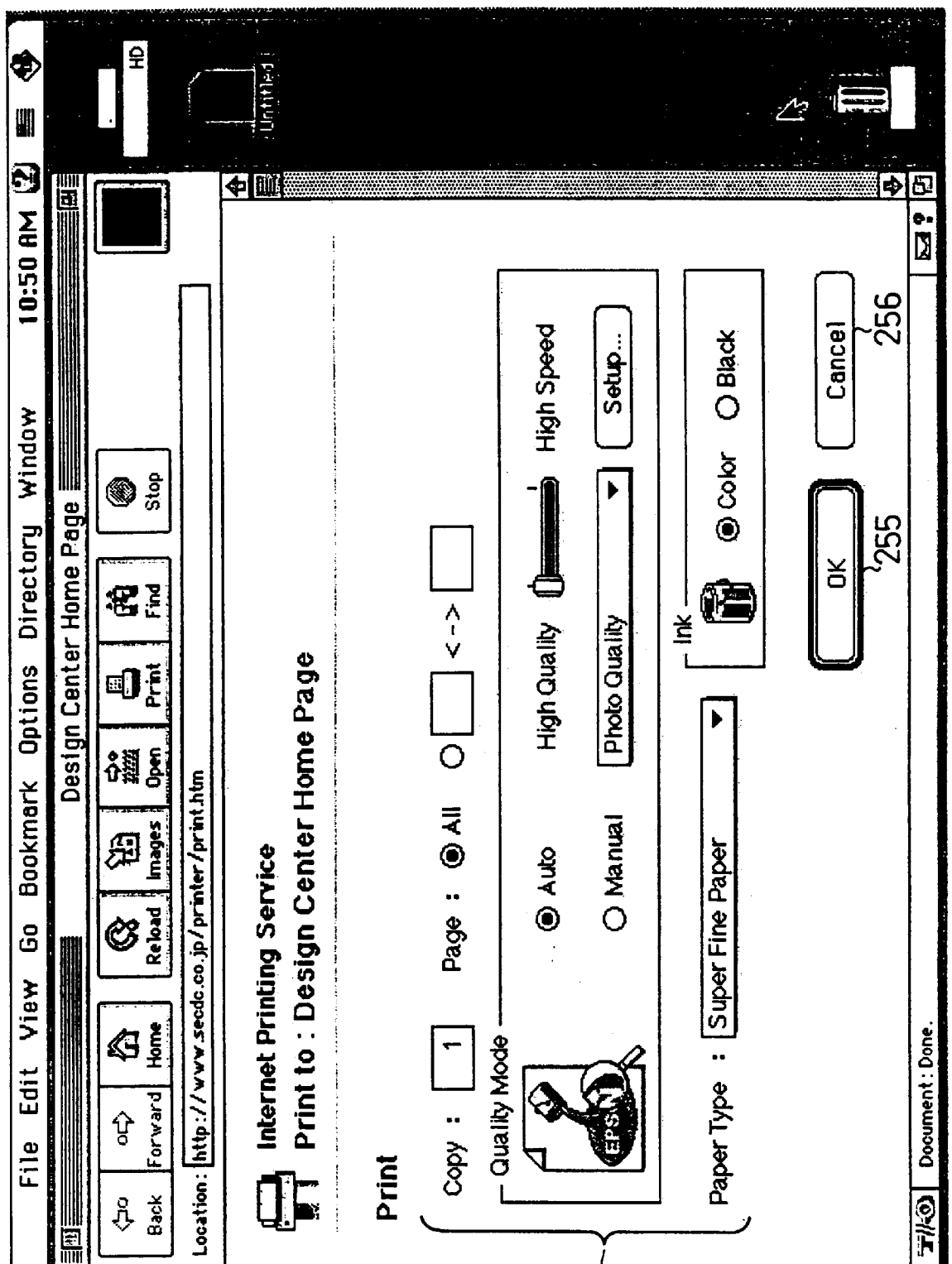
FIG. 6 shows the exemplified user interface for inputting the print settings information displayed on the screen of the monitor 250, based on the user interface data.

FIGS. 5 and 6 show exemplified user interfaces for inputting the print settings information displayed on the display screen of the monitor 250, based on the transmitted user interface data. FIG. 5 shows a window for paper settings, and FIG. 6 shows a window for print specification.

The window for paper settings as shown in FIG. 5 is displayed as the user interface for inputting the print settings information on the display screen of the monitor 250. The user of the transmitter computer 200 here inputs details of paper settings 252, which include the paper size, the paper source, the orientation, and the print size, through the operation of the input device 240. On conclusion of the input, the user clicks an OK button 253. This causes the window for print specification as shown in FIG. 6 to appear. The user then inputs details of print specification 254, which include the number of copies, the printing range, the printing quality, the paper type, and the ink color, according to the requirements through the operation of the input device 240. Although not specifically included in the details of print specification 254, a color correction method (that is, a color matching method) may also be input according to the requirement of the user.

At step S108, the user clicks an OK button 255 with the input device 240 when the user requires to transmit the color image data ID to the receiver computer 100 and cause the printer A (180) to print the contents of the color image data ID, that is a color image, whereas the user clicks a Cancel button 256 when it is not required.

The input processing unit 212 transfers the various pieces of input print settings information and the result of the button clicking to the transmission control unit 211. In the case where the Cancel button 256 has been clicked in the window for print specification, the transmission control unit 211 concludes the series of processing.

In the case where the OK button 255 has been clicked in the window for print specification, on the other hand, the transmission control unit 211 first reads the color image data ID (271), which is the object of transmission, from the hard disk 270, then reads the color-correction source data 272 corresponding to the display settings of the monitor 250 (that is, the profile for the monitor 250), and transmits the color image data 271 and the color-correction source data 272 together with the various pieces of input print settings information to the receiver computer 100 via the communications device 160 at step S110.

The receiver computer 100 receives the transmitted color image data 271, color-correction source data 272, and various pieces of print settings information via the communications device 160. The transmission control unit 111 then transfers the input color image data 271, color-correction source data 272, and various pieces of print settings information to the print processing unit 114. The print processing unit 114 is actualized by a printer driver software exclusively used for the printer 180, and includes the resolution conversion element 115, the color correction element 118, the color conversion element 116, and the halftone processing element 117 as mentioned previously.

At step S112, the respective elements of the print processing unit 114 carry out the following processes for the input color image data 271, based on the input print settings information and color-correction source data 272, in order to give a desirable printed image.

The resolution conversion element 115 carries out a resolution conversion process, for example, interpolation or skipping, with respect to the color image data 271, based on the input print settings information, in order to allow a resulting color image to have a desired resolution in printing.

The color correction element 118 reads the print settings information to specify a variety of print settings of the printer 180 that include the pixel density of printing, the halftone processing method (for example, the dither process or the error diffusion process), and the color correction method, and selects the color-correction destination data 172 corresponding to the print settings (that is, the profile for the printer 180) among the plural pieces of color-correction destination data stored in advance in the hard disk 170. The color correction element 118 then causes the color image data 271 to undergo the color correction as discussed previously, based on the transmitted color-correction source data 272 and the selected color-correction destination data 172. The concrete procedure of the color correction converts the color image data RGB expressible in the gamut reproducible by the monitor 250 (that is, the color image data used for the monitor 250) into the color image data R"G"B" expressible in the gamut reproducible by the printer 180 (that is, the color image data used for the printer 180). This arrangement enables the tints of the color image printed by the printer 180 connected to the receiver computer 100 to be as close as possible to the tints of the color image displayed on the monitor 250 in the transmitter computer 200.

The color conversion element 116 subsequently converts the color image data R"G"B" to, for example, CMYK data corresponding to the inputs of the printer 180.

The halftone processing element 117 further carries out a known dither process or error diffusion process with respect to the converted color image data CMYK, based on the print settings information, in order to enable the resulting printed image to have a desired tone expression.

On conclusion of the above processes, the print processing unit 114 outputs the processed color image data to the printer 180 via the I/O unit 120. The printer 180 prints a color image, that is, the contents of the color image data, on a sheet of printing paper, based on the input color image data at step S114.

In this manner, the color image data 271 is transferred with the color-correction source data 272 and the print settings information from the transmitter computer 200 to the receiver computer 100 via the Internet 600. In the receiver computer 100, the print processing unit 114 carries out the variety of processing operations, based on the print settings information. Especially the color correction element 118 of the print processing unit 114 carries out the color correction based on the transmitted color-correction source data 272 and the color-correction destination data 172 read from the hard disk 170. The printer 180 then prints a color image, that is, the contents of the processed color image data.

As discussed above, even if the printer driver exclusively provided for the printer 180 connected to the receiver computer 100 has not been installed in the transmitter computer 200, the structure of this embodiment causes the user interface data for inputting the print settings information exclusively provided for the printer 180 to be transferred from the receiver computer 100 to the transmitter computer 200, and allows the print settings information for the printer 180 to be transmitted from the transmitter computer 200 to the receiver computer 100. This arrangement enables the printer 180 connected to the receiver computer 100 to print a color image, based on the color image data or print data transmitted via the Internet 600.

The structure of the embodiment causes the color-correction source data 272, which is the profile for the monitor 250, to be transferred together with the color image data (that is, the color image data used for the monitor 250) from the transmitter computer 200 to the receiver computer 100. Even if the printer driver exclusively provided for the printer 180 has not been installed in the transmitter computer 200, this arrangement enables the color image data to undergo an appropriate color correction process in the receiver computer 100. The tints of the color image printed by the printer 180 can thus become as close as possible to the tints of the color image displayed on the monitor 250. The arrangement of this embodiment accordingly enables the printer 180 connected to the receiver computer 100 to print a color image with the tints desired by the user of the transmitter computer 200.

In this embodiment, the user interface data supplied from the receiver computer 100 to the transmitter computer 200 is mainly written in the HTML that does not depend upon any specific machine type. The user interface data usable by the transmitter computer 200 can thus be transferred to the transmitter computer 200, without requiring the receiver computer 100 to identify the machine type of the transmitter computer 200.

Since the user interface data is HTML data, a mechanism for calling a software component to utilize a CGI (Common Gateway Interface) function on the receiver computer 100 may be set in the user interface data. This mechanism enables the transmitter computer 200 to remote control the functions of the receiver computer 100. When the CPU 210 in the transmitter computer 200 has a low processing ability but the CPU 110 in the receiver computer 100 has a high processing ability, the transmitter computer 200 places the processing in the of the receiver computer 100 to ensure the high-performance processing.

The above description regards the case in which the user of the transmitter computer 200 has selected the printer A (180) for printing a color image in the example of FIG. 2. In the case where another printer is selected, the similar procedure is adopted to transmit the color image data and print the contents of the color image data.

For example, in the case where the printer E (520) is selected in the example of FIG. 2, the user interface data, which is used to display a user interface for inputting the print settings information corresponding to the printer E (520), is transmitted from the receiver computer main body 501 to the transmitter computer main body 201. The print settings information, the color image data, and the color-correction source data are then transmitted from the transmitter computer main body 201 to the receiver computer main body 501.

In the receiver computer main body 501, the print processing unit carries out the required processing for the transmitted color image data, based on the print settings information and the color-correction source data. On conclusion of the processing, the processed color image data is output to the communications device via the I/O unit and further transmitted from the communications device to the printer E (520) via the LAN 700, so that the printer E (520) prints a color image based on the processed color image data.

In the example of FIG. 2, it is also possible to transmit the color image data from the transmitter computer main body 401 to each computer for printing a color image.

Namely the arrangement of this embodiment enables the contents of the image data selected by the user of the transmitter computer to be printed by a specified printer according to the desired print settings conditions via the Internet 600.

Although the color correction of the color image data is carried out in the receiver computer 100 in the first embodiment discussed above, the color correction may alternatively be carried out in the transmitter computer 200.

Figure 7:
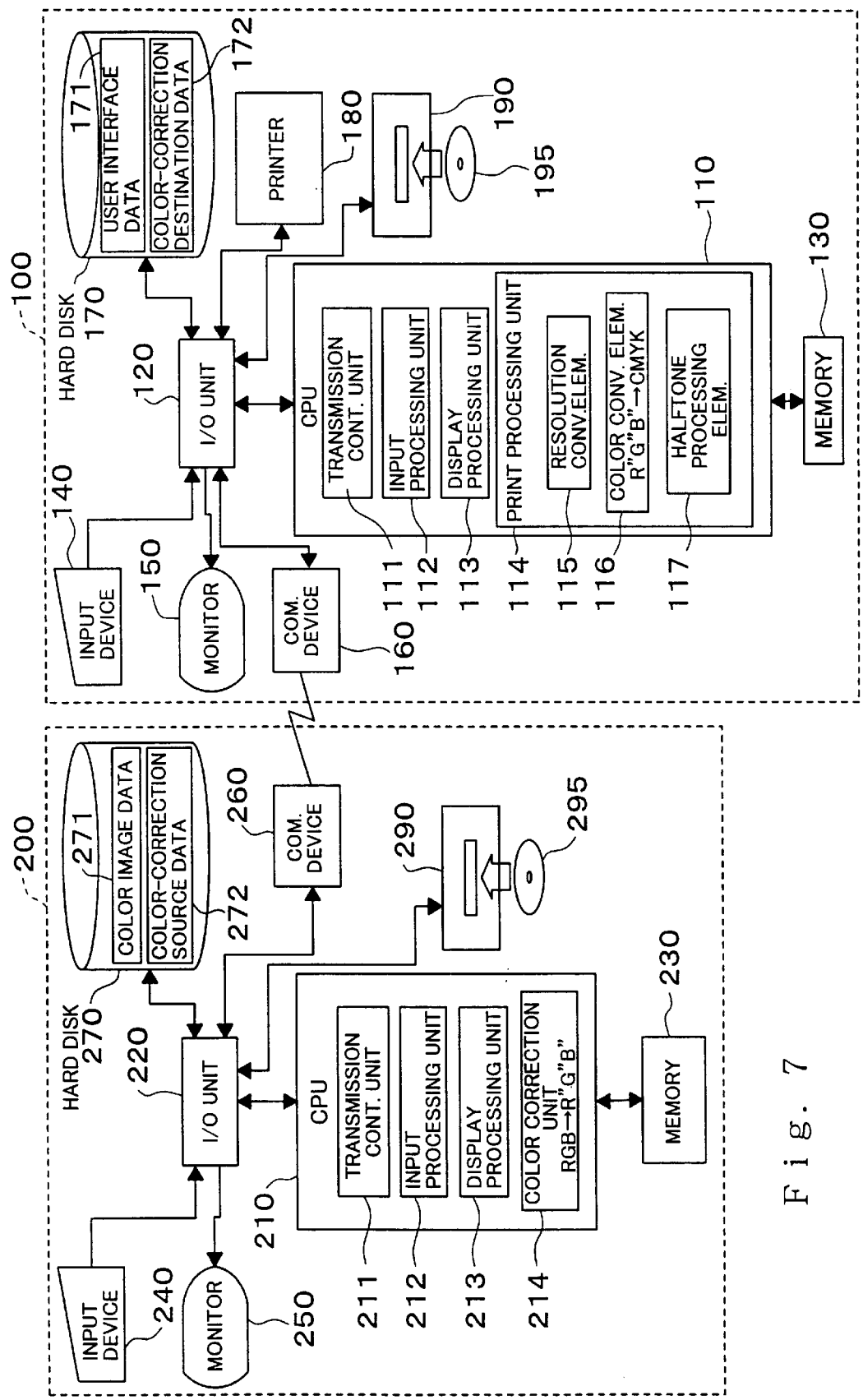
FIG. 7 is a block diagram illustrating the structure of another print data transfer system as a second embodiment according to the present invention.

The following describes another embodiment, in which the color correction of the color image data is carried out in the transmitter computer 200, with the drawing of FIG. 7.

FIG. 7 is a block diagram illustrating another print data transfer system as a second embodiment according to the present invention.

The difference between the print data transfer system of the second embodiment and the print data transfer system of the first embodiment is that the function of the color correction element 118 included in the print processing unit 114 of the CPU 110 in the receiver computer 100 shown in FIG. 1 is replaced with the function of a color correction unit 214 included in the CPU 210 in the transmitter computer 200 shown in FIG. 7. The other constituents of the second embodiment are identical with those of the first embodiment.

Figure 8:
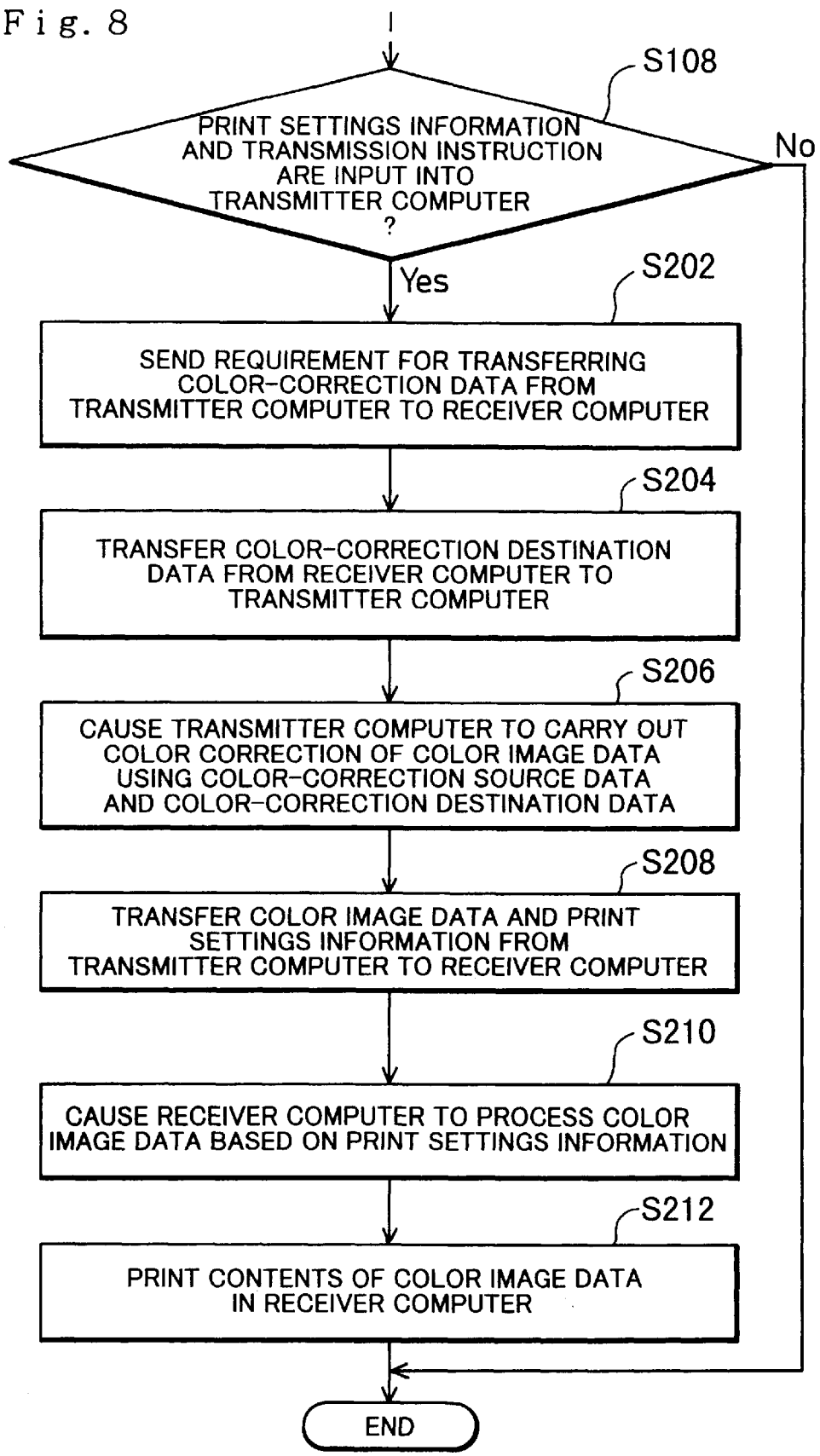
FIG. 8 is a flowchart showing an essential part of the processing routine executed in the print data transfer system of the second embodiment shown in FIG. 7.

FIG. 8 is a flowchart showing an essential part of the processing routine executed in the print data transfer system of FIG. 7. The processing steps before step S108 in the processing routine of the second embodiment are identical with those shown in the flowchart of FIG. 3 and are thereby omitted from the flowchart of FIG. 8. The main characteristics of the second embodiment are described below with the flowchart of FIG. 8.

When the user of the transmitter computer 200 clicks the OK button 255 in the window for print specification shown in FIG. 6 and inputs a transmission instruction of the color image data 271, the transmission control unit 211 reads the input print settings information to specify a variety of print settings of the printer 180 that include the pixel density of printing, the halftone processing method (for example, the dither process or the error diffusion process), and the color correction method. The transmission control unit 211 then transmits a requirement for transferring the color-correction destination data corresponding to the print settings of the printer 180 (that is, the profile for the printer 180) to the receiver computer 100 via the communications device 260 at step S202.

When the receiver computer 100 receives the transmitted requirement for transferring the color-correction data, the transmission control unit 111 selects the color-correction destination data 172 corresponding to the print settings of the printer 180 (that is, the profile for the printer 180) among the plural pieces of color-correction destination data stored in advance in the hard disk 170, and transmits the selected color-correction destination data 172 to the transmitter computer 200 via the communications device 160 at step S204.

When the transmitter computer 200 receives the transmitted color-correction destination data 172, the color correction unit 214 reads the color image data 271, which is the object to be transmitted, as well as the color-correction source data 272 corresponding to the display settings of the monitor 250 (that is, the profile for the monitor 250) from the hard disk 270. The control correction unit 214 then carries out the color correction of the color image data 271 in the same manner as discussed above using the transmitted color-correction destination data 172 and the read-out color-correction source data 272 at step S206.

The transmission control unit 211 subsequently transmits the color-corrected color image data and the print settings information to the receiver computer 100 via the communications device 260 at step S208.

The receiver computer 100 receives the transmitted color image data and print settings information via the communications device 160. The transmission control unit 111 then transfers the input color image data and print settings information to the print processing unit 114.

At subsequent step S210, the resolution conversion element 115, the color conversion element 116, and the halftone processing element 117 in the print processing unit 114 carry out the respective processing operations discussed above for the input color image data based on the input print settings information, in order to obtain a desirable printed image.

On conclusion of the above processing, the print processing unit 114 outputs the color image data to the printer 180 via the I/O unit 120. The printer 180 prints a color image, that is, the contents of the color image data, on the printing paper based on the input color image data at step S212.

As described above, in the structure of the second embodiment, the color-correction destination data 172 is transmitted from the receiver computer 100 to the transmitter computer 200. The color correction unit 214 carries out the color correction of the color image data 271, based on the transmitted color-correction destination data 172 and the color-correction source data 272 read from the hard disk 270. The color image data after the color correction is transmitted together with the print settings information from the transmitter computer 200 to the receiver computer 100 via the Internet 600. The printer 180 connected to the receiver computer 100 then prints a color image based on the input color image data.

In the second embodiment, the color-correction destination data 172, which is the profile for the printer 180, is transmitted from the receiver computer 100 to the transmitter computer 200. The transmitter computer 200 then carries out an appropriate color correction with respect to the color image data. Even if a printer driver exclusively provided for the printer 180 has not been installed in the transmitter computer 200, this arrangement enables the tints of the color image printed by the printer 180 based on the color image data transferred to the receiver computer 100 to be as close as the tints of the color image displayed on the monitor 250. The arrangement of this embodiment accordingly enables the printer 180 connected to the receiver computer 100 to print a color image with the tints desired by the user of the transmitter computer 200.

In this embodiment, when the user of the transmitter computer 200 inputs a transmission instruction of the color image data 271, the transmission control unit 211 reads the input print settings information to specify a variety of print settings of the printer 180 and transmits a requirement for transferring the color-correction destination data corresponding to the print settings to the receiver computer 100. The principle of the present invention is, however, not restricted to such arrangement, but is applicable to modified structures. In one modified application, the transmission control unit 211 does not specify the color-correction destination data corresponding to the print settings, but simply transmits a requirement for transferring the color-correction destination data, together with the input print settings information. In the receiver computer 100, the transmission control unit 111 reads the transmitted print settings information to specify the variety of print settings of the printer 180 and selects the color-correction destination data 172 corresponding to the print settings among the plural pieces of color-correction destination data stored in the hard disk 170.

In the first and the second embodiments discussed above, either one of the receiver computer 100 and the transmitter computer 200 carries out the color correction of the color image data. In accordance with another possible application, the receiver computer 100 and the transmitter computer 200 share the color correction process.

Figure 9:
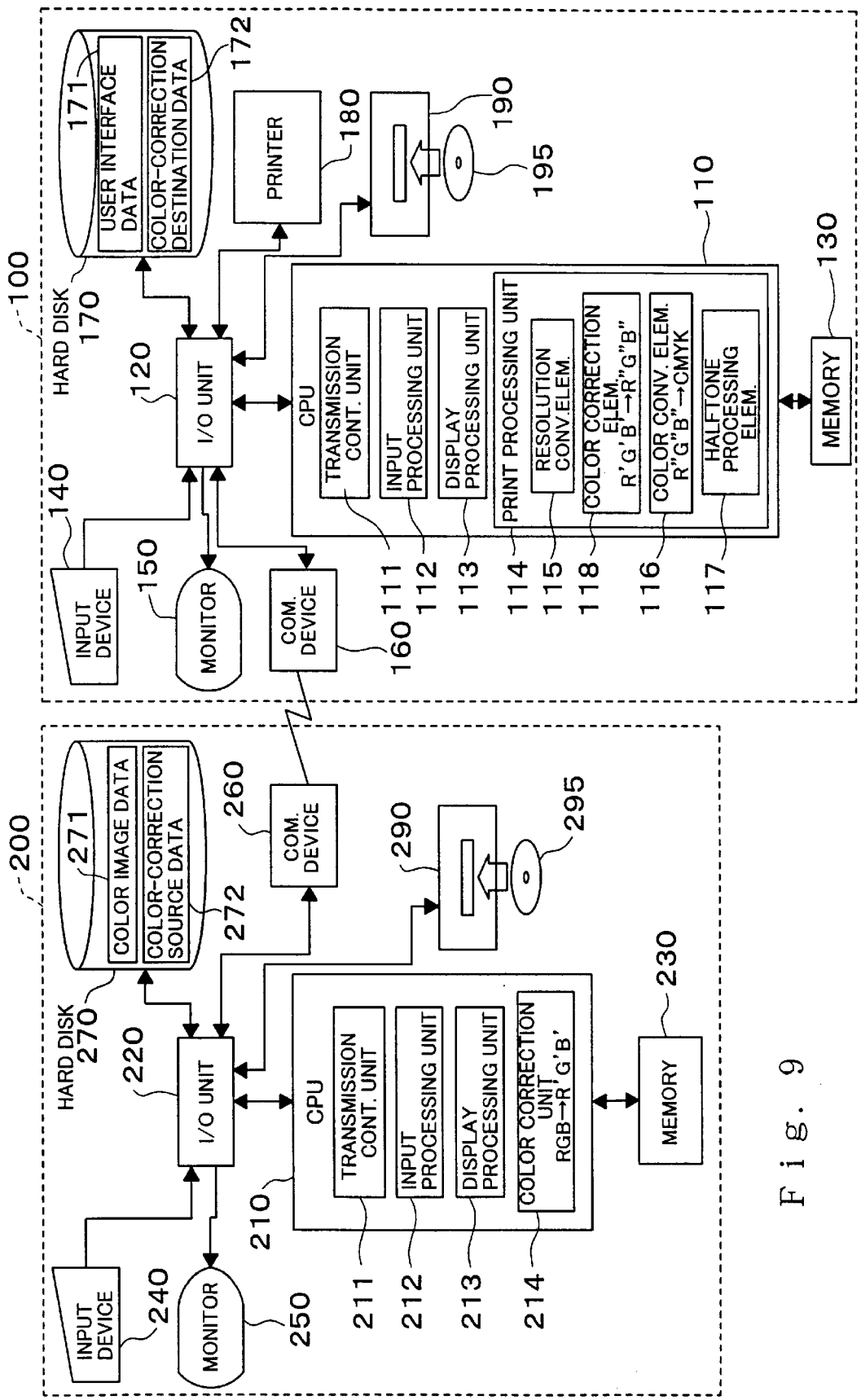
FIG. 9 is a block diagram illustrating the structure of still another print data transfer system as a third embodiment according to the present invention.

The following describes still another embodiment, in which the receiver computer 100 and the transmitter computer 200 share the color correction process of the color image data, with the drawing of FIG. 9.

FIG. 9 is a block diagram illustrating still another print data transfer system as a third embodiment according to the present invention.

As shown in FIG. 9, the difference of the print data transfer system of the third embodiment from the print data transfer systems of the first and the second embodiments is that the color correction element 118 is included in the print processing unit 114 of the CPU 110 in the receiver computer 100, whereas the color correction unit 214 is included in the CPU 210 in the transmitter computer 200. The other constituents of the third embodiment are identical with those of the first and the second embodiments.

FIG. 10 is a flowchart showing an essential part of the processing routine executed in the print data transfer system of FIG. 9. The processing steps before step S108 in the processing routine of the third embodiment are identical with those shown in the flowchart of FIG. 3 and are thereby omitted from the flowchart of FIG. 10. The main characteristics of the third embodiment are described below with the flowchart of FIG. 10.

When the user of the transmitter computer 200 clicks the OK button 255 in the window for print specification shown in FIG. 6 and inputs a transmission instruction of the color image data 271, the color correction unit 214 reads the color image data 271, which is the object to be transmitted, as well as the color-correction source data 272 corresponding to the display settings of the monitor 250 (that is, the profile for the monitor 250) from the hard disk 270, and carries out the color correction of the color image data 271 based on the color-correction source data 272 at step S302. The concrete procedure of the color correction converts the color image data RGB expressible in the gamut reproducible by the monitor 250 (that is, the color image data used for the monitor 250) into the color image data R'G'B' expressible in the gamut reproducible by the virtual color image device. The colors expressed by the color image data are accordingly shifted from the gamut reproducible by the monitor 250 to the gamut reproducible by the virtual color image device (that is, the ideal gamut) in the color space.

The transmission control unit 211 subsequently transmits the color-corrected color image data and the print settings information to the receiver computer 100 via the communications device 260 at step S304.

The receiver computer 100 receives the transmitted color image data and print settings information via the communications device 160. The transmission control unit 111 then transfers the input color image data and print settings information to the print processing unit 114.

At subsequent step S306, the resolution conversion element 115, the color conversion element 116, and the halftone processing element 117 in the print processing unit 114 carry out the respective processing operations discussed above for the input color image data based on the input print settings information, in order to obtain a desirable printed image, whereas the color correction element 118 carries out the following process.

The color correction element 118 reads the transmitted print settings information to specify a variety of print settings of the printer 180 that include the pixel density of printing, the halftone processing method (for example, the dither process or the error diffusion process), and the color correction method, and selects the color-correction destination data 172 corresponding to the print settings of the printer 180 (that is, the profile for the printer 180) among the plural pieces of color-correction destination data stored in advance in the hard disk 170. The color correction element 118 then carries out the color correction of the color image data, based on the color-correction destination data 172. The concrete procedure of the color correction converts the color image data R'G'B' expressible in the gamut reproducible by the virtual color image device into the color image data R"G"B" expressible in the gamut reproducible by the printer 180 (that is, the color image data used for the printer 180). The colors expressed by the color image data are accordingly shifted from the gamut reproducible by the virtual color image device (that is, the ideal gamut) to the gamut reproducible by the printer 180 in the color space.

On conclusion of the above processing, the print processing unit 114 outputs the color image data to the printer 180 via the I/O unit 120. The printer 180 prints a color image, that is, the contents of the color image data, on the printing paper based on the input color image data at step S308.

As described above, in the structure of the third embodiment, the color correction unit 214 in the transmitter computer 200 carries out the color correction of the color image data 271 using the color-correction source data 272 read from the hard disk 270. The color image data after the color correction is transmitted together with the print settings information from the transmitter computer 200 to the receiver computer 100 via the Internet 600. The color correction element 118 of the print processing unit 114 then carries out the further color correction using the color-correction destination data 172 read from the hard disk 170. The printer 180 finally prints a color image, which is the contents of the color image data, based on the color-corrected color image data.

In the third embodiment, the transmitter computer 200 carries out an appropriate color correction of the color image data based on the color-correction source data 272, which is the profile for the monitor 250. The receiver computer 100 subsequently carries out an appropriate color correction based on the color-correction destination data 172, which is the profile for the printer 180. Even if a printer driver exclusively provided for the printer 180 has not been installed in the transmitter computer 200, this arrangement enables the tints of the color image printed by the printer 180 to be as close as possible to the tints of the color image displayed on the monitor 250. The arrangement of this embodiment accordingly enables the printer 180 connected to the receiver computer 100 to print a color image with the tints desired by the user of the transmitter computer 200.

The present invention is not restricted to the above embodiments or their modifications, but there may be many other modifications, changes, and alterations without departing from the scope or spirit of the main characteristics of the present invention.

In the above embodiments, the color image data 271 stored in the hard disk 170 is identical with the color image data used for the monitor 250 (that is, the color image data expressible in the gamut reproducible by the monitor 250). The principle of the present invention is, however, not restricted such color image data, but is applicable to arbitrary color image data, for example, color image data read with a scanner, those obtained by shooting with a digital camera, and those relating to another color image device. In such cases, it is necessary to provide, as the color-correction source data, a profile for a scanner (that is, data used for a conversion from the color image data expressible in the gamut reproducible by the scanner into the color image data expressible in the gamut reproducible by the virtual color image device), a profile for a digital camera (that is, data used for a conversion from the color image data expressible in the gamut reproducible by the digital camera into the color image data expressible in the gamut reproducible by the virtual color image device), or the like.

In the above embodiments, the transmitter computer 200 is connected to the receiver computer 100 via the Internet 600. The principle of the present invention is, however, not restricted to the Internet, but is applicable to a variety of computer networks, for example, a telephone communication network, a LAN, and a WAN (including an Intranet).

The image data transmitted from the transmitter computer 200 to the receiver computer 100 via the Internet 600 is bit-map data of gray scales of R, G, and B in the above embodiments. The present invention is, however, not restricted to such color image data, but is applicable to any color image data having the data structure that does not depend upon the control codes of the printer or the like.

In the above embodiments, the printer is used as the printing unit. A printing machine, a copy machine, a facsimile, and other printing devices may also be used for the printing unit.

It should be clearly understood that the above embodiments are only illustrative and not restrictive in any sense. The scope and spirit of the present invention are limited only by the terms of the appended claims.

What is claimed is:

1. A print data transfer system comprising:

a first computer;

a second computer connected to the first computer via a computer network; and a printer which is connected to the second computer and prints contents represented by print data; wherein the first computer comprises a first memory that stores the print data, a first transmission unit that executes transmission of the print data, an input device, a display device, and a first controller that controls operation of the first computer, the second computer comprises a second memory that stores user interface data, which is used to display a user interface for allowing a user to input print settings information for the printer, a second transmission unit that executes transmission of the user interface data, and a second controller that controls operation of the second computer, the first controller causes the first transmission unit to send an instruction for starting a transmission process of the print data to the second computer when receiving the instruction for starting the transmission process via the input device, the second controller reads the user interface data from the second memory and causes the second transmission unit to send the user interface data to the first computer when receiving the instruction for starting the transmission process via the second transmission unit, the first controller causes the display device to display the user interface for allowing the user to input print settings information based on the user interface data when receiving the user interface data via the first transmission unit, the first controller reads the print data from the first memory and causes the first transmission unit to send the print data and the print settings information, which is to be used in a printing process by the printer, to the second computer when receiving the print settings information and a transmission instruction of the print data via the input device, and the second controller causes the printer to print the contents represented by the print data according to the print settings information when receiving the print data and the print settings information via the second transmission unit.

2. A print data transfer system in accordance with claim 1, wherein the user interface data is written in a computer language of a machine-independent type.

3. A print data transfer system in accordance with claim 1, wherein the first controller causes the display device to display an icon corresponding to either one of the second computer and the printer, and the instruction for starting the transmission process of the print data is input into the first computer by selecting the icon, which has been displayed by the display device, through an operation of the input device.

4. A print data transfer system in accordance with claim 1, wherein the print data has a data structure that is independent of a control code structure of the printer.

5. A print data transfer system in accordance with claim 1, wherein the printer is connected to the second computer via a computer network.

6. A print data transfer system comprising:

a first computer;

a second computer connected to the first computer via a computer network; and a printer which is connected to the second computer and prints a color image, the first computer comprising:

a color image device;

a first memory that stores color image data, which is expressible in a first gamut reproducible by the color image device in a color space, and first color-correction data, which is to be used for converting the color image data expressible in the first gamut into another color image data expressible in a second gamut in the color space;

a first transmission unit that transmits and receives data; and a first controller that controls operation of the first computer, the second computer comprising:

a second memory that stores second color-correction data, which is to be used for converting the color image data expressible in the second gamut into another color image data expressible in a third gamut reproducible by the printer in the color space;

a second transmission unit that transmits and receives data; and a second controller that controls operation of the second computer, wherein the first controller reads the first color-correction data and the color image data expressible in the first gamut from the first memory and causes the first transmission unit to send the color image data expressible in the first gamut as print data together with the first color-correction data to the second computer, and the second controller reads the second color-correction data from the second memory, carries out a color correction with the first color-correction data and the second color-correction data to convert the color image data expressible in the first gamut into the color image data expressible in the third gamut, and causes the printer to print the color image based on the color-corrected color image data, when receiving the color image data expressible in the first gamut and the first color-correction data via the second transmission unit.

7. A print data transfer system in accordance with claim 6, wherein the print data has a data structure that is independent of a control code structure of the printer.

8. A print data transfer system in accordance with claim 6, wherein the printer is connected to the second computer via a computer network.

9. A print data transfer system comprising:

a first computer;

a second computer connected to the first computer via a computer network; and a printer which is connected to the second computer and prints a color image, the first computer comprising:
   a color image device;
   a first memory that stores color image data, which is expressible in a first gamut reproducible by the color image device in a color space, and first color-correction data, which is to be used for converting the color image data expressible in the first gamut into another color image data expressible in a second gamut in the color space;
   a first transmission unit that transmits and receives data; and
   a first controller that controls operation of the first computer, the second computer comprising:
   a second memory that stores second color-correction data, which is to be used for converting the color image data expressible in the second gamut into another color image data expressible in a third gamut reproducible by the printer in the color space;
   a second transmission unit that transmits and receives data; and
   a second controller that controls operation of the second computer, wherein the first controller causes the first transmission unit to send a requirement for transfer of color-correction data to the second computer, the second controller reads the second color-correction data from the second memory and causes the second transmission unit to send the second color-correction data to the first computer, when receiving the requirement for transfer, the first controller reads the first color-correction data and the color image data expressible in the first gamut from the first memory, carries out a color correction with the first color-correction data and the second color-correction data to convert the color image data expressible in the first gamut into the color image data expressible in the third gamut, and causes the first transmission unit to send the color-corrected color image data as print data to the second computer, when receiving the second color-correction data via the first transmission unit, the second controller causes the printer to print the color image based on the color-corrected color image data, when receiving the color-corrected color image data via the second transmission unit.

10. A print data transfer system in accordance with claim 9, wherein the print data has a data structure that is independent of a control code structure of the printer.

11. A print data transfer system in accordance with claim 9, wherein the printer is connected to the second computer via a computer network.

12. A print data transfer system comprising:

a first computer;

a second computer connected to the first computer via a computer network; and a printer which is connected to the second computer and prints a color image, the first computer comprising:
   a color image device;
   a first memory that stores color image data, which is expressible in a first gamut reproducible by the color image device in a color space, and first color-correction data, which is to be used for converting the color image data expressible in the first gamut into another color image data expressible in a second gamut in the color space;
   a first transmission unit that transmits and receives data; and
   a first controller that controls operation of the first computer, the second computer comprising:
   a second memory that stores second color-correction data, which is to be used for converting the color image data expressible in the second gamut into another color image data expressible in a third gamut reproducible by the printer in the color space;
   a second transmission unit that transmits and receives data; and
   a second controller that controls operation of the second computer, wherein the first controller reads the first color-correction data and the color image data expressible in the first gamut from the first memory, carries out a first color correction with the first color-correction data to convert the color image data expressible in the first gamut into the color image data expressible in the second gamut, and causes the first transmission unit to send the color image data after the first color correction as print data to the second computer, the second controller reads the second color-correction data from the second memory, carries out a second color correction with the second color-correction data to convert the color image data expressible in the second gamut after the first color correction into the color image data expressible in the third gamut, and causes the printer to print the color image based on the color image data after the second color correction, when receiving the color image data after the first color correction via the second transmission unit.

13. A print data transfer system in accordance with claim 12, wherein the print data has a data structure that is independent of a control code structure of the printer.

14. A print data transfer system in accordance with claim 12, wherein the printer is connected to the second computer via a computer network.

15. A method of transferring print data, which represents contents to be printed, from a first computer comprising at least a display device to a second computer, which is connected to a printer, via a computer network, the method comprising the steps of:
  (a) causing the first computer to transmit an instruction for starting a transmission process to the second computer, when the first computer receives the instruction for starting the transmission process of the print data;
  (b) causing the second computer to transmit user interface data, which is used to display a user interface for allowing a user to input print settings information for the printer, to the first computer, when the second computer receives the instruction for starting the transmission process;
  (c) causing the display device to display the user interface for allowing the user to input print settings information based on the user interface data, when the first computer receives the user interface data;
  (d) causing the first computer to transmit the print data and the print settings information, which is to be used in a printing process by the printer, to the second computer, when the first computer receives the print settings information and a transmission instruction of the print data; and
  (e) causing the printer to print the contents represented by the print data according to the print settings information, when the second computer receives the print data and the print settings information.

16. A method of transferring print data for printing a color image from a first computer comprising at least a color image device to a second computer, which is connected to a printer, via a computer network, the method comprising the steps of:
  (a) providing color image data, which is expressible in a first gamut reproducible by the color image device in a color space, and first color-correction data, which is to be used for converting the color image data expressible in the first gamut into another color image data expressible in a second gamut in the color space, in the first computer, and providing second color-correction data, which is to be used for converting the color image data expressible in the second gamut into another color image data expressible in a third gamut reproducible by the printer in the color space, in the second computer;
  (b) causing the first computer to transmit the color image data expressible in the first gamut as the print data together with the first color-correction data to the second computer;
  (c) causing the second computer to carry out a color correction with the first color-correction data and the second color-correction data to convert the color image data expressible in the first gamut into the color image data expressible in the third gamut, when the second computer receives the color image data expressible in the first gamut and the first color-correction data; and
  (d) causing the printer to print a color image based on the color-corrected color image data.

17. A method of transferring print data for printing a color image from a first computer comprising at least a color image device to a second computer, which is connected to a printer, via a computer network, the method comprising the steps of:
  (a) providing color image data, which is expressible in a first gamut reproducible by the color image device in a color space, and first color-correction data, which is to be used for converting the color image data expressible in the first gamut into another color image data expressible in a second gamut in the color space, in the first computer, and providing second color-correction data, which is to be used for converting the color image data expressible in the second gamut into another color image data expressible in a third gamut reproducible by the printer in the color space, in the second computer;
  (b) causing the first computer to transmit a requirement for transfer of color-correction data to the second computer;
  (c) causing the second computer to transmit the second color-correction data to the first computer, when the second computer receives the requirement for transfer;
  (d) causing the first computer to carry out a color correction with the first color-correction data and the second color-correction data to convert the color image data expressible in the first gamut into the color image data expressible in the third gamut, when the first computer receives the second color-correction data;
  (e) causing the first computer to transmit the color-corrected color image data as the print data to the second computer; and
  (f) causing the printer to print a color image based on the color-corrected color image data, when the second computer receives the color-corrected color image data.

18. A method of transferring print data for printing a color image from a first computer comprising at least a color image device to a second computer, which is connected to a printer, via a computer network, the method comprising the steps of:
  (a) providing color image data, which is expressible in a first gamut reproducible by the color image device in a color space, and first color-correction data, which is to be used for converting the color image data expressible in the first gamut into another color image data expressible in a second gamut in the color space, in the first computer, and providing second color-correction data, which is to be used for converting the color image data expressible in the second gamut into another color image data expressible in a third gamut reproducible by the printer in the color space, in the second computer;
  (b) causing the first computer to carry out a first color correction with the first color-correction data to convert the color image data expressible in the first gamut into the color image data expressible in the second gamut;
  (c) causing the first computer to transmit the color image data after the first color correction as the print data to the second computer;
  (d) causing the second computer to carry out a second color correction with the second color-correction data to convert the color image data expressible in the second gamut after the first color correction into the color image data expressible in the third gamut, when the second computer receives the color image data after the first color correction; and
  (e) causing the printer to print a color image based on the color image data after the second color correction.

19. A computer program product that causes a computer comprising at least a display device to transmit print data to a receiver, which is connected to a printer, via a computer network, the computer program product comprising:

a computer readable medium;

a first program code unit that causes the computer to transmit an instruction for starting a transmission process of the print data to the receiver when the instruction for starting the transmission process is input;

a second program code unit that causes the computer to receive user interface data, which is used to display a user interface for allowing a user to input print settings information for the printer, when the user interface data is transmitted from the receiver, and that causes the display device to display the user interface for allowing a user to input print settings information based on the user interface data; and a third program code unit that causes the computer to transmit the print data and the print settings information, which is to be used in a printing process by the printer, to the receiver when the print settings information and a transmission instruction of the print data are input, wherein each of the program code units is registered on the computer readable medium.

20. A computer program product that causes a computer, which is connected to a printer, to receive print data transmitted from a transmitter comprising at least a display device via a computer network, the computer program product comprising:

a computer readable medium;

a first program code unit that causes the computer to transmit user interface data, which is used to display a user interface for allowing a user to input print settings information for the printer, to the transmitter when the computer receives an instruction for starting a transmission process of the print data transmitted from the transmitter; and a second program code unit that causes the computer to receive the print data and the print settings information, which is to be used in a printing process by the printer, when the print data and the print settings information are transmitted from the transmitter, and that causes the printer to print contents represented by the print data according to the print settings information, wherein each of the program code units is registered on the computer readable medium.

* * * * *